United States Patent
Ikeuchi et al.

(10) Patent No.: US 9,309,375 B2
(45) Date of Patent: Apr. 12, 2016

(54) WATER-ABSORBING AGENT HAVING WATER-ABSORBENT RESIN AS A MAIN COMPONENT AND PRODUCTION METHOD OF THE WATER-ABSORBING AGENT

(75) Inventors: Hiroyuki Ikeuchi, Hyogo (JP); Shigeru Sakamoto, Hyogo (JP); Sayaka Machida, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 1179 days.

(21) Appl. No.: 12/088,345

(22) PCT Filed: Sep. 25, 2006

(86) PCT No.: PCT/JP2006/319627
§ 371 (c)(1),
(2), (4) Date: Jun. 17, 2008

(87) PCT Pub. No.: WO2007/037454
PCT Pub. Date: Apr. 5, 2007

(65) Prior Publication Data
US 2009/0281232 A1 Nov. 12, 2009

(30) Foreign Application Priority Data
Sep. 30, 2005 (JP) ................. 2005-289399

(51) Int. Cl.
| C08K 11/00 | (2006.01) |
| C08K 3/10 | (2006.01) |
| C08L 33/02 | (2006.01) |
| C08F 261/06 | (2006.01) |
| C08K 5/053 | (2006.01) |
| B01J 20/26 | (2006.01) |
| C08J 3/24 | (2006.01) |

(52) U.S. Cl.
CPC .............. *C08K 5/053* (2013.01); *B01J 20/26* (2013.01); *B01J 20/261* (2013.01); *B01J 20/267* (2013.01); *C08J 3/245* (2013.01); *B01J 2220/68* (2013.01); *C08J 2300/14* (2013.01)

(58) Field of Classification Search
CPC ........ B01J 20/26; B01J 20/261; B01J 20/267; C08K 5/053; C08J 3/245
USPC .................. 524/556, 765, 767, 783, 786, 796
See application file for complete search history.

(56) References Cited

U.S. PATENT DOCUMENTS

| 5,051,259 | A |  | 9/1991 | Olsen et al. |
| 5,314,420 | A | * | 5/1994 | Smith et al. .................. 604/358 |
| 6,414,214 | B1 |  | 7/2002 | Engelhardt et al. |
| 2002/0128618 | A1 | * | 9/2002 | Frenz et al. .................. 604/368 |
| 2002/0185629 | A1 |  | 12/2002 | Fujii et al. |
| 2004/0157989 | A1 | * | 8/2004 | Bruhn et al. ................. 525/54.2 |
| 2005/0245684 | A1 | * | 11/2005 | Daniel et al. .................. 525/178 |
| 2006/0036043 | A1 | * | 2/2006 | Nestler et al. ............... 525/329.7 |
| 2007/0125568 | A1 | * | 6/2007 | Kida et al. ................... 174/77 R |
| 2008/0027180 | A1 |  | 1/2008 | Higashimoto et al. |

FOREIGN PATENT DOCUMENTS

| EP | 0 349 240 B1 | 4/1997 |
| EP | 0 579 764 B1 | 8/1999 |
| EP | 0 951 913 A1 | 10/1999 |
| EP | 0 640 330 B1 | 5/2000 |
| EP | 0 629 411 B1 | 10/2001 |
| EP | 1358892 | 11/2003 |
| JP | 56-26909 | 3/1981 |
| JP | 56-93716 | 7/1981 |
| JP | 2005113117 | 4/2005 |
| JP | 2005-154758 | 6/2005 |
| JP | 2005-200630 | 7/2005 |
| JP | 2006-225456 | 8/2006 |
| JP | 2006225456 | 8/2006 |
| JP | 2006233008 | 9/2006 |
| WO | WO 95/26209 | 10/1995 |
| WO | WO 98/47454 | 10/1998 |
| WO | WO 01/45758 A1 | 6/2001 |
| WO | WO 01/66056 A1 | 9/2001 |
| WO | 0194459 | 12/2001 |
| WO | WO 2004/113452 A1 | 12/2004 |
| WO | WO 2005/044915 A1 | 5/2005 |

OTHER PUBLICATIONS

Japanese Office Action dated Dec. 11, 2012 issued in corresponding Japanese Application No. 2008-516057, and English translation thereof.
European Search Report dated Aug. 23, 2011 in European Application No. 06810982.6.

* cited by examiner

*Primary Examiner* — David W Wu
*Assistant Examiner* — Marie Reddick
(74) *Attorney, Agent, or Firm* — Dickinson Wright PLLC

(57) ABSTRACT

To provide (i) a water-absorbing agent, having a water-absorbent resin as a main component, whose absorbency is high and liquid permeability is enhanced and (ii) a production method thereof. The water-absorbing agent of the present invention includes a water-absorbent resin obtained by polymerizing an unsaturated monomer having a carboxyl group and included in an aqueous monomer solution in the presence of at least a non high molecular compound having four or more functional groups each capable of forming a covalent bond with a carboxyl group.

15 Claims, 1 Drawing Sheet

WATER-ABSORBING AGENT HAVING WATER-ABSORBENT RESIN AS A MAIN COMPONENT AND PRODUCTION METHOD OF THE WATER-ABSORBING AGENT

TECHNICAL FIELD

The present invention relates to a water-absorbing agent having a water-absorbent resin as a main component and a production method of the water-absorbing agent.

BACKGROUND ART

Recently, in order to absorb body fluids such as urine, blood, and the like, a water-absorbent resin is widely used as a main component of an absorbent structure concerning body fluid absorption in sanitary materials (absorbing articles) such as a disposable diaper, a sanitary napkin, an incontinence pad, and the like.

Known examples of the water-absorbent resin include: a partially neutralized crosslinked polyacrylic acid polymer; a hydrolyzed starch-acrylonitrile graft polymer; a neutralized starch-acrylic acid graft polymer; a saponified vinyl acetate-acrylic ester copolymer; a crosslinked carboxymethyl cellulose; a hydrolyzed or crosslinked acrylnitryl copolymer or acrylamide copolymer; a crosslinked cationic monomer; a crosslinked isobutylene-maleic acid copolymer; a crosslinked polymer of 2-acrylamide-2-methylpropanesulfonic acid and acrylic acid; and the like.

There has conventionally been needs for a water-absorbent resin having the following water absorption characteristics: (i) a high absorbency, (ii) an excellent absorption rate, (iii) excellent liquid permeability, (iv) excellent gel strength of a swollen gel, (v) an excellent absorptive power (absorbing and wicking property) when water is absorbed from a base material containing an aqueous liquid, (vi) and the like, with respect to an aqueous liquid such as a body fluid.

In recent years, a sanitary material such as a disposable diaper has higher performance and a thinner size, and an amount (g) of the water-absorbent resin used for each sanitary material is increased and also a ratio (weight %) of the water-absorbent resin is increased with respect to the whole absorbent structure, thereby making the sanitary material thinner while increasing the absorption amount and preventing leakage of the aqueous liquid. The absorbent structure having a larger amount of the water-absorbent resin is preferable in view of the liquid storage. However, when the water-absorbent resin is actually used in a sanitary material such as a diaper, the water-absorbent resin is swollen into a soft gel due to water absorption. This results in gel blocking such that a liquid (urine or blood) which should be subsequently absorbed cannot permeate into the absorbent structure, so that an absorption amount drops and leakage occurs.

Recently, the liquid permeability of the water-absorbent resin attracts attentions and a great number of cases concerning a water-absorbent resin having higher liquid permeability are reported (for example, see Patent Documents 1 to 7). For example, it is known that particle diameter distribution greatly contributes to the liquid permeability (for example, see Patent Documents 8 to 11), and there is reported a technique in which volume of pore in the gel are increased by increasing particle diameters so as to enhance the liquid permeability (for example, see Patent Document 1 and other document).

However, there is a problem that: if the volume of pore in the gel are increased by increasing the particle diameters so as to enhance the liquid permeability, the liquid is less absorbed.

As a method for solving such a problem, there is disclosed a method which allows the liquid to be more favorably absorbed by use of a water-absorbent resin particles having tetravalent or further multivalent polyol on surfaces of the particles and hydroxyl groups of the polyol exist partially in a free manner (for example, see Patent Document 12 and other document).

Further, as a method which allows enhancement of the liquid permeability without crosslinking a surface of the water-absorbent resin, there is disclosed a method for producing a polymer having high liquid permeability and low absorption capacity (low absorbency) by crosslinking a polymer with use of two types of covalent bond crosslinking agents such as a polyvinyl crosslinking agent and a crosslinking agent having a hydroxyl group (for example, see Patent Document 13 and other document).

[Patent Document 1]
Pamphlet of International Publication No. 95/26209
[Patent Document 2]
Specification of European Patent No. 0951913
[Patent Document 3]
Specification of European Patent No. 0640330
[Patent Document 4]
Pamphlet of International Publication No. 2001/066056
[Patent Document 5]
Pamphlet of International Publication No. 98/47454
[Patent Document 6]
Specification of U.S. Pat. No. 6,414,214
[Patent Document 7]
Specification of U.S. Unexamined Patent Publication No. 2002/128618
[Patent Document 8]
Specification of U.S. Pat. No. 5,051,259
[Patent Document 9]
Specification of European Patent No. 0349240
[Patent Document 10]
Specification of European Patent No. 0579764
[Patent Document 11]
Specification of European Patent No. 0629411
[Patent Document 12]
Japanese Unexamined Patent Publication No. 154758/2005 (Tokukai 2005-154758)
[Patent Document 13]
Japanese National Publication of Translated Version No. 518150/2003 (Tokuhyo 2003-518150)

DISCLOSURE OF INVENTION

However, the water-absorbent resin whose liquid permeability is enhanced by the conventional method has higher liquid permeability but is not sufficiently balanced in view of the entire water-absorption characteristics.

That is, the technique in which the volume of pore in the gel are increased by increasing the particle diameters so as to enhance the liquid permeability raises such a problem that the greater volume of pore obtained by increasing the particle diameters result in lower absorptive power and lower absorption rate or raises a similar problem.

Further, according to the method in which a polymer is crosslinked with use of two types of covalent bond crosslinking agents such as a polyvinyl crosslinking agent and a crosslinking agent having a hydroxyl group, it is possible to achieve the high liquid permeability but it is possible to produce only a polymer whose absorbency is low.

The present invention was made in view of the foregoing problems, and an object of the present invention is to provide (i) a water-absorbent resin whose liquid permeability is enhanced without dropping the water-absorption characteristics such as the absorptive power, the absorption rate, the absorbency, and the like, and (ii) a water-absorbing agent having the water-absorbent resin, and (iii) a production method thereof, based on finding of a method for enhancing the liquid permeability in a manner different from the conventional method.

The inventors of the present invention diligently studied in view of the foregoing problems. As a result of the study, they polymerized an unsaturated monomer having a carboxyl group by using, as an internal crosslinking agent, a non high molecular compound having four or more functional groups each capable of forming a covalent bond with a carboxyl group so that the polymerization is carried out in the presence of the non high molecular compound. Then, they compared thus obtained water-absorbent resin with (a) a case of solely using an internal crosslinking agent having three or less functional groups each capable of forming a covalent bond with a carboxyl group or (b) a case of using the internal crosslinking agent together with an internal crosslinking agent having two or more polymerizable ethylenical double bonds. They first found that the liquid permeability was greatly enhanced through the foregoing operation, thereby completing the present invention.

In order to solve the foregoing problem, a water-absorbing agent of the present invention includes as a main component a water-absorbent resin having a crosslinked structure obtained by polymerizing an unsaturated monomer having a carboxyl group, wherein at least a non high molecular compound having four or more functional groups each capable of forming a covalent bond with a carboxyl group is introduced into an inside of the water-absorbent resin.

Further, the water-absorbing agent may be arranged so as to include as a main component a water-absorbent resin having a crosslinked structure obtained by polymerizing an unsaturated monomer having a carboxyl group, wherein at least a non high molecular compound having four or more functional groups each capable of forming a covalent bond with a carboxyl group is introduced into an inside of the water-absorbent resin, and the inside of the water-absorbent resin is crosslinked with at least a part of the non high molecular compound introduced into the inside of the water-absorbent resin.

The water-absorbent resin may be arranged so that at least a part of the non high molecular compound is such that any functional group capable of forming a covalent bond with a carboxyl group does not form a bond with the carboxyl group of the water-absorbent resin.

Note that, in the present invention, a condition under which "a non high molecular compound having four or more functional groups each capable of forming a covalent bond with a carboxyl group is introduced into an inside" means a condition under which the non high molecular compound is distributed over the whole water-absorbent resin or the whole water-absorbent resin particles, and this is different from surface crosslinking and surface coating of the water-absorbent resin or the water-absorbent resin particles. That is, there has been conventionally known a technique in which an outermost surface (for example, 0.01 to several μm) of the water-absorbent resin particles whose particle diameter is about 150 to 850 μm is subjected to surface crosslinking or surface coating (EP 1680470 or other publication). In such a conventional technique, a compound (surface crosslinking agent or surface coating agent) is added to dried water-absorbent resin particles, and a small amount of solvent (for example, 0.1 to 10 weight % of water relative to the water-absorbent resin particles) is used at that time if necessary, so that the compound (surface crosslinking agent or surface coating agent) is unevenly distributed over the outermost surface of the water-absorbent resin particles, thereby causing the compound (surface crosslinking agent or surface coating agent) to be unevenly distributed over the outermost surface and causing the compound (surface crosslinking agent or surface coating agent) to have lower concentration as it is positioned more internally, so that the compound (surface crosslinking agent or surface coating agent) does not substantially exist in the inside of the water-absorbent resin particles. In contrast, the present invention is characterized in that: the non high molecular compound is distributed over or crosslinks the whole water-absorbent resin or the whole water-absorbent resin particles and preferably the non high molecular compound is substantially evenly distributed over or crosslinks the whole water-absorbent resin (including the inside thereof) or the whole water-absorbent resin particles (including the inside thereof). In this manner, the effects of the present invention (for example, enhancement of the liquid permeability) can be achieved by introducing the non high molecular compound into the inside of the water-absorbent resin.

Further, it is preferable that: with respect to the water-absorbing agent, there is included 100 ppm or more of the non high molecular compound in which any functional group capable of forming a covalent bond with a carboxyl group does not form a bond with the carboxyl group of the water-absorbent resin.

It is preferable that a molecular weight of the non high molecular compound is not more than 5000. Further, it is preferable that a functional group equivalent weight of the non high molecular compound is not less than 20 and not more than 200 g/mol.

It is preferable that the inside of the water-absorbent resin is further crosslinked with an internal crosslinking agent having two or more polymerizable ethylenical double bonds per molecule, and/or an internal crosslinking agent other than the non high molecular compound which internal crosslinking agent has two or more functional groups per molecule. Above all, it is preferable that the water-absorbent resin is further subjected to internal crosslinking with an internal crosslinking agent having two or more polymerizable ethylenical double bonds per molecule. It is preferable that the water-absorbent resin is further subjected to surface crosslinking with an organic surface crosslinking agent and/or an inorganic surface crosslinking agent.

It is preferable that the water-absorbent resin is made of water-absorbent resin particles so that a ratio of particles whose particle diameter is not less than 150 μm and less than 850 μm is not less than 90 weight % with respect to a total amount of the water-absorbent resin particles.

Further, it is preferable that each of the functional groups each capable of forming a covalent bond with a carboxyl group is a hydroxyl group or an amino group.

In addition, the water-absorbing agent of the present invention further includes a liquid-permeability-enhancement agent. Further, it is preferable that in case where 0.5 g of the water-absorbing agent is dispersed in 50 ml of a physiological saline whose temperature is 20° C. so as to obtain a water-absorbing agent dispersion liquid, a surface tension of the water-absorbing agent dispersion liquid is not less than 55 mN/m.

It is preferable to arrange the water-absorbing agent of the present invention so that an absorbency (CRC) of the water-absorbing agent is greater than 25 g/g, and it is preferable to arrange the water-absorbing agent of the present invention so that a saline flow conductivity (SFC) of the water-absorbing agent is not less than 30 $cm^3 \cdot s \cdot 10^{-7}/g$.

In order to solve the foregoing problems, a method according to the present invention for producing a water-absorbing agent which includes as a main component a water-absorbent resin having a crosslinked structure obtained by polymerizing an unsaturated monomer having a carboxyl group, said method includes the steps of: (i) polymerizing the unsaturated monomer having a carboxyl group and included in an aqueous monomer solution in the presence of at least a non high molecular compound having four or more functional groups each capable of forming a covalent bond with a carboxyl group, so as to obtain a hydropolymer; and (ii) drying the hydropolymer, obtained in the step (i), so as to obtain the water-absorbent resin, wherein relative to the unsaturated monomer having a carboxyl group, an amount of usage (Y) (mol %) of the non high molecular compound is in the range expressed by the following equation (1):

$$Y<0.06/\{2-(1.35X/100)\} \qquad (1)$$

where X represents a neutralization ratio (mol %) of the carboxyl group of the water-absorbent resin, X being not less than 45 and not more than 85.

It is preferable that the step (i) is such that: the unsaturated monomer having a carboxyl group and included in the aqueous monomer solution is polymerized in the presence of (1) the non high molecular compound having four or more functional groups each capable of forming a covalent bond with a carboxyl group and (2) an internal crosslinking agent having two or more polymerizable ethylenical double bonds per molecule and/or an internal crosslinking agent other than the non high molecular compound which internal crosslinking agent has two or more functional groups per molecule, so as to obtain the hydropolymer. Further, it is more preferable that the step (i) is such that: the unsaturated monomer having a carboxyl group and included in the aqueous monomer solution is polymerized in the presence of (1) the non high molecular compound having four or more functional groups each capable of forming a covalent bond with a carboxyl group and (2) an internal crosslinking agent having two or more polymerizable ethylenical double bonds per molecule, so as to obtain the hydropolymer.

In addition, it is preferable that the method according to the present invention for producing the water-absorbing agent further includes the step of (iii) crosslinking a surface of the water-absorbent resin with an organic surface crosslinking agent and/or an inorganic surface crosslinking agent.

Further, it is preferable that the method according to the present invention for producing the water-absorbing agent further includes the step of (iv) adding a liquid-permeability-enhancement agent. It is preferable that the liquid-permeability-enhancement agent is a water-soluble polyvalent metal compound or a water-soluble polycationic compound. It is more preferable that the liquid-permeability-enhancement agent is at least one compound selected from an aluminum compound, a zirconium compound, a titanium compound, and a compound having an amino group.

As described above, the water-absorbing agent according to the present invention includes as a main component a water-absorbent resin having a crosslinked structure obtained by polymerizing an unsaturated monomer having a carboxyl group, wherein at least a non high molecular compound having four or more functional groups each capable of forming a covalent bond with a carboxyl group is introduced into an inside of the water-absorbent resin, so that it is possible to remarkably enhance the liquid permeability compared with a case where an internal crosslinking agent having three or less functional groups each capable of forming a covalent bond with a carboxyl group is solely used or a case where an internal crosslinking agent having three or less functional groups and an internal crosslinking agent having two or more polymerizable ethylenical double bonds are used together with each other. Also, it is possible to provide the water-absorbent resin whose liquid permeability is enhanced without dropping the water-absorption characteristics such as the absorptive power, the absorption rate, the absorbency, and the like.

Further, as to the water-absorbing agent according to the present invention, in case where the water-absorbent resin is further crosslinked with an internal crosslinking agent (second crosslinking agent) having two or more polymerizable ethylenical double bonds and/or an internal crosslinking agent (third crosslinking agent) other than the non high molecular compound which internal crosslinking agent has two or more functional groups, the gel strength after the polymerization is improved, so that the handling characteristics and the water absorbing properties are improved.

As described above, the method according to the present invention for producing the water-absorbing agent includes the arrangement for introducing at least a non high molecular compound having four or more functional groups each capable of forming a covalent bond with a carboxyl group into an inside of a water-absorbent resin by polymerizing an unsaturated monomer in the presence of the non high molecular compound. Thus, it is possible to remarkably enhance the liquid permeability compared with a case where an internal crosslinking agent having three or less functional groups each capable of forming a covalent bond with a carboxyl group is solely used or a case where an internal crosslinking agent having three or less functional groups and an internal crosslinking agent having two or more polymerizable ethylenical double bonds are used together with each other. Also, it is possible to provide the water-absorbent resin whose liquid permeability is enhanced without dropping the water-absorption characteristics such as the absorptive power, the absorption rate, the absorbency, and the like.

BEST MODE FOR CARRYING OUT THE INVENTION

Figure 1:
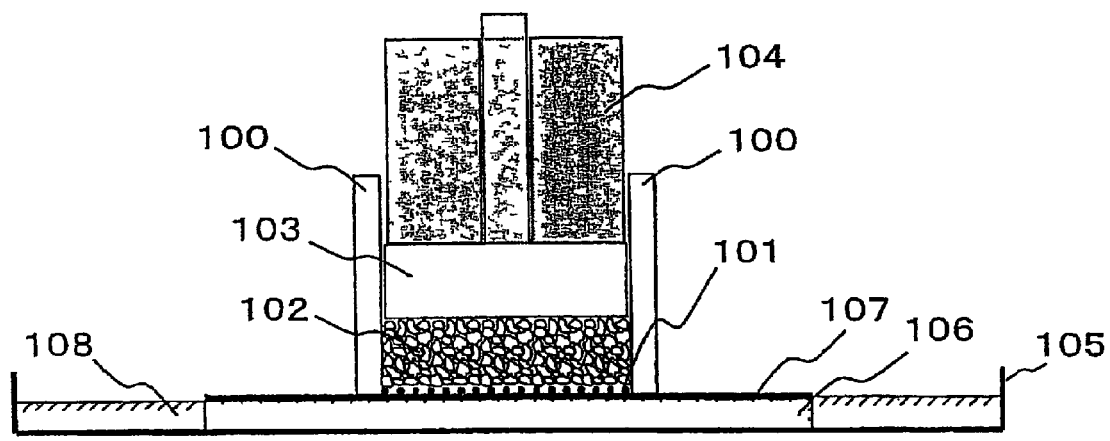
FIG. 1 is a cross sectional view schematically illustrating a measuring apparatus used to measure AAP.

The following explains a water-absorbing agent of the present invention and a method for producing the water-absorbing agent. Further, in the present invention, assume that values of (a) absorbency (CRC: Centrifuge Retention Capacity), (b) AAP (Absorbency Against Pressure), (c) absorption rate (FSR: Free Swell Rate), (d) SFC: Saline Flow Conductivity, (e) particle diameter, (f) logarithmic standard deviation ($\sigma\zeta$) of particle diameter distribution, (g) Bulk density, (h) extractable component content, (i) solid content or moisture content, (j) surface tension, and (k) amount of unreacted non high molecular compound relative to the water-absorbing agent are obtained by the measurement methods described below in Examples. Note that, in the present invention, "weight" is used as a synonym for "mass", and "weight %" is used as a synonym for "mass %".

(1) Water-Absorbing Agent According to the Present Invention

The water-absorbing agent according to the present invention contains, as a main component, a water-absorbent resin obtained by polymerizing an unsaturated monomer having a carboxyl group, wherein the water-absorbent resin has a crosslinked structure, and at least a non high molecular compound having four or more functional groups each capable of forming a covalent bond with a carboxyl group is introduced into an inside of the water-absorbent resin (preferably is evenly introduced into the water-absorbent resin). It is preferable that the non high molecular compound introduced in the inside of the water-absorbent resin forms a bond with the carboxyl group of the water-absorbent resin, and it is more preferable that the non high molecular compound crosslinks the inside of the water-absorbent resin. Note that, at least a part of the non high molecular compound may be such that any functional group capable of forming a covalent bond with a carboxyl group is contained in the water-absorbent resin without forming a bond with the carboxyl group of the water-absorbent resin as long as the water-absorbent resin has a crosslinked structure. Thus, also an arrangement in which the whole non high molecular compound is such that any functional group capable of forming a covalent bond with a carboxyl group is contained in the water-absorbent resin without forming a bond with the carboxyl group of the water-absorbent resin is regarded as one of the states in which at least the non high molecular compound having four or more functional groups each capable of forming a covalent bond with a carboxyl group is introduced into a inside of the water-absorbent resin.

Note that, in the present invention, the "non high molecular compound" means a compound other than a high molecular compound. The "high molecular compound" means a compound obtained by polymerization or means a naturally existing compound, having same structural parts repeatedly formed, whose molecular weight (weight-average molecular weight) is greater than 5000.

The water-absorbing agent in the present invention refers to an agent for absorption and solidification of aqueous liquids, which agent comprises the water-absorbent resin as the main component and, if necessary, further comprises a small amount of additive and/or water. The "water-absorbent resin as the main component" herein refers to 50 weight % or more water-absorbent resin content relative to the entire water-absorbing agent. The water-absorbent resin content is preferably in the range of 60 to 100 weight %, more preferably 80 to 100 weight %, still more preferably 90 to 100 weight %, particularly preferably 95 to 100 weight %, relative to the entire water-absorbing agent. Thus, also a water-absorbing agent constituted only of the water-absorbent resin is regarded as the water-absorbing agent of the present invention. As a component other than the water-absorbent resin in the water-absorbing agent, usually, water is contained as its main component, and further such as the below-mentioned additive is used. Note that, the aqueous liquid is free from especial limitation if it contains water. Examples of the aqueous liquid include: water, urine; blood; excrement; waste liquids; moisture; steam; ice; mixtures of water and organic and/or inorganic solvents; rainwater; and underground water. However, preferably, the water-absorbing agent of the present invention is used as an agent for absorption and solidification of urine, particularly, human urine.

The following will describe (1-1) Water-absorbent resin contained in the water-absorbing agent of the present invention, (1-2) Components other than the water-absorbent resin, (1-3) Shape and particle diameter of the water-absorbent resin and water-absorbing agent, (1-4) Water-absorbing characteristics of the water-absorbing agent of the present invention, and (1-5) Usage of the water-absorbing agent of the present invention.

(1-1) Water-Absorbent Resin Contained in the Water-Absorbing Agent of the Present Invention The water-absorbent resin used in the present invention is a water-absorbent resin obtained by polymerizing an unsaturated monomer having a carboxyl group, and having a crosslinked structure, wherein at least a non high molecular compound having four or more functional groups each capable of forming a covalent bond with a carboxyl group is introduced into an inside of the water-absorbent resin, and the non high molecular compound preferably forms a bond with a carboxyl group in the water-absorbent resin and more preferably crosslinks the inside of the water-absorbent resin. Also, at least a part of the non high molecular compound may be such that any functional group capable of forming a covalent bond with a carboxyl group is contained in the water-absorbent resin without forming a bond with the carboxyl group of the water-absorbent resin. Note that, a condition under which "at least a part of the non high molecular compound may be such that any functional group capable of forming a covalent bond with a carboxyl group is contained in the water-absorbent resin without forming a bond with the carboxyl group of the water-absorbent resin" means also a condition under which an entire amount of the non high molecular compound is such that any functional group capable of forming a covalent bond with a carboxyl group does not form a bond with the carboxyl group of the water-absorbent resin.

In the present invention, the water-absorbent resin refers to a hydrogel-formable, water-swellable, and water-insoluble crosslinked polymer. Generally, the term "water-swellable" means absorbing a large quantity of water, e.g. ion exchanged water of essentially not less than 5 times, more preferably not less than 10 times, still more preferably not less than 20 times, particularly preferably 50 to 1000 times self weight of the water-absorbent resin. Also, it can be said that the "water-swellable" crosslinked polymer is the one having "absorbency in ion exchanged water" of not less than 5, more preferably not less than 10, still more preferably not less than 20, particularly preferably 50 to 1000. Note that, the "absorbency in ion exchanged water" is obtained in the same manner as the below-mentioned water absorbency (CRC) measurement method, except for measuring in ion exchanged water and using a water-absorbent resin or water-absorbing agent of 0.020 g as an object to be measured.

The term "water-insoluble" means having an uncrosslinked extractable component content (water-soluble polymer) of preferably 0 to 50 weight %, more preferably not more than 25 weight %, still more preferably not more than 20 weight %, yet more preferably not more than 15 weight %, particularly preferably not more than 10 weight %, contained in the water-absorbent resin, relative to the total weight of the water-absorbent resin. Note that, these measurements are performed in conformity to Examples of the present invention.

<Water-Absorbent Resin Obtained by Polymerizing an Unsaturated Monomer Having a Carboxyl Group>

In the present invention, favorably used as the water-absorbent resin is a water-absorbent resin obtained by polymerizing an unsaturated monomer having a carboxyl group, and having a crosslinked structure. In the present invention, also a monomer which becomes a carboxyl group after polymerization due to hydrolysis, e.g., acrylonitryl is regarded as the water-soluble unsaturated monomer having a carboxyl group. However, it is preferable to use an unsaturated monomer having a carboxyl group at the time of polymerization.

Examples of the water-absorbent resin obtained by polymerizing an unsaturated monomer having a carboxyl group include: polymers obtained by polymerizing and crosslinking carboxyl-group containing unsaturated monomers having a carboxyl group such as (meth)acrylic acid, maleic anhydride, maleic acid, fumaric acid, crotonic acid, itaconic acid, and cinnamic acid, and/or their salts (neutralizer); hydrolyzed graft polymers of starch-acrylonitrile; graft polymers of starch-acrylic acid; saponified copolymers of vinyl acetate-acrylic ester; hydrolyzed or crosslinked acrylonitrile copolymers or acrylamide copolymers; denatured carboxyl-group containing crosslinked polyvinyl alcohol; crosslinked copolymers of isobutylene-maleic anhydride; or either one or a combination of two or more substances among the above, substances. Above all, the water-absorbent resin is preferably a water-absorbent resin including a crosslinked polyacrylic acid (salt) polymer obtained by polymerizing a monomer including acrylic acid and/or its salt as a main component.

The crosslinked polyacrylic acid (salt) polymer in the present invention is a polymer which is obtained by polymerizing a monomer (excluding crosslinking agent) containing acrylic acid and/or its salt in an amount of preferably 50 to 100 mol %, more preferably 70 to 100 mol %, still more preferably 90 to 100 mol %, relative to the entire amount of the monomer, and has a crosslinked structure in its inside.

In addition, 45 to 85 mol % of the carboxyl group in the water-absorbent resin are preferably neutralized to form salt. In other words, the carboxyl group of the water-absorbent resin preferably has a neutralization ratio of 45 to 85 mol %, more preferably 50 to 85 mol %, still more preferably 55 to 80 mol %, particularly preferably 60 to 75 mol %. As examples of the salt, there can be cited one of or two or more of such as: alkaline metal (e.g. sodium, potassium, lithium) salts, ammonium salts, and amine salts. The neutralization of the carboxyl group for forming the salt may be carried out in a monomer state before the polymerization, or may be carried out in a polymer state on the way of or after the polymerization, or may be carried out in these three states.

Note that, a neutralization ratio of a carboxyl group in the water-absorbent resin can be obtained by calculation from (i) the amount of unsaturated monomer having a not-yet-neutralized carboxyl group and (ii) the total amount of bases as used for neutralization before the polymerization, during the polymerization, and/or after the polymerization. Alternatively, as mentioned below, the neutralization ratio may be obtained by titration of an extractable component content in the water-absorbent resin.

The water-absorbent resin preferably used in the present invention may, if necessary, realized by a copolymer obtained by copolymerizing another monomer jointly with the water-soluble unsaturated monomer having a carboxyl group (if crosslinked polyacrylic acid (salt) polymer, acrylic acid and/or its salt) used as the main component.

Specific examples of the above other monomer include: water-soluble or hydrophobic unsaturated monomers such as methacrylic acid, maleic anhydride, maleic acid, fumaric acid, crotonic acid, itaconic acid, vinylsulfonic acid, 2-(meth)acrylamido-2-methylpropanesulfonic acid, (meth)acryloxy-alkanesulfonic acid and alkaline metal salt or ammonium salt of these acids, ammonium salt, N-vinyl-2-pyrrolidone, N-vinylacetamide), (meth)acrylamide, N-isopropyl(meth)acrylamide, N,N-dimethyl(meth)acrylamide, 2-hydroxyethyl (meth)acrylate, methoxypolyethylene glycol (meth)acrylate, polyethylene glycol (meth)acrylate, isobutylene, and lauryl (meth)acrylate.

When the water-absorbent resin is the crosslinked polyacrylic acid (salt) polymer, in case of using monomers other than acrylic acid (salt), the amount of these monomers used as monomers other than acrylic acid (salt) is preferably in the range of 0 to 30 mol %, more preferably 0 to 10 mol %, of the entire monomers. As a result, it is possible to further improve the water absorbing characteristics of the resultant water-absorbent resin and water-absorbing agent, and it is possible to obtain the water-absorbent resin (water-absorbing agent) at lower cost.

<Crosslinked Structure>

The water-absorbent resin used in the present invention has a crosslinked structure at least in their inside, more preferably in their inside and surface.

Further, the water-absorbent resin used in the present invention is arranged so that at least a non high molecular compound having four or more functional groups each capable of forming a covalent bond with a carboxyl group is introduced into an inside of the water-absorbent resin. As a result, the resultant water-absorbent resin and water-absorbing agent have much higher liquid permeability than the case of solely using an internal crosslinking agent having three or less functional groups each, capable of forming a covalent bond with a carboxyl group or using an internal crosslinking agent having three or less functional groups and an internal crosslinking agent having two or more polymerizable ethylenical double bonds together with each other.

As described above, the non high molecular compound preferably crosslinks the inside of the water-absorbent resin, but there is a case where the non high molecular compound forms a bond with the water-absorbent resin but fails to form the internal crosslinked structure or there is a case where any functional group capable of forming a covalent bond with the carboxyl group is contained in the water-absorbent resin without forming a bond with the carboxyl group of the water-absorbent resin. In case where the inside of the water-absorbent resin is not crosslinked with the non high molecular compound, the water-absorbent resin used in the present invention is internally crosslinked with below-mentioned self-crosslinking monomer, below-mentioned other internal crosslinking agent, and/or a polymerizable ethylenical double bond or the like the non high molecular compound further has as will be described below.

Here, the functional group which is capable of forming a covalent bond with a carboxyl group is not particularly limited as long as the functional group forms a bond with the carboxyl group of the water-absorbent resin. Examples thereof include a hydroxyl group, an amino group, an epoxy group, an oxetane group, an ethyleneimine group (aziridine group), an isocyanate group, oxazoline, cyclocarbonate, oxazolidinone, cyclic urea, an azithidinium salt group, and chlorohydrin. Above all, it is more preferable that the functional group is a hydroxyl group, an amino group, an oxetane group, oxazoline, cyclocarbonate, oxazolidinone, cyclic urea, or the like. As a result, it is possible to provide a water-absorbing agent which is excellent in view of the safety.

Thus, examples of the non high molecular compound having four or more functional groups each capable of forming a covalent bond with a carboxyl group include: a non high molecular compound having four or more hydroxyl groups; a non high molecular compound having four or more amino groups; a non high molecular compound having four or more epoxy groups; a non high molecular compound having four or more oxetane groups; a non high molecular compound having four or more ethyleneimine groups (aziridine groups); a non high molecular compound having four or more isocyanate groups; a non high molecular compound having four or more oxazolines; a non high molecular compound having four or more cyclocarbonates; a non high molecular compound having four or more oxazolidinones; a non high molecular compound having four or more cyclic ureas; a non high molecular compound having four or more azithidinium salts; a non high molecular compound having four or more chlorohydrins; and a non high molecular compound having two or more kinds of functional groups selected from among hydroxyl group, amino group, epoxy group, oxetane group, ethyleneimine group (aziridine group), isocyanate group, oxazoline, cyclocarbonate, oxazolidinone, cyclic urea, azithidinium salt and chlorohydrin, wherein a combined total number of groups in the selected functional groups is not less than four. Above all, the non high molecular compound having four or more functional groups each capable of forming a covalent bond with a carboxyl group is more preferably the non high molecular compound having one or more kinds of functional groups selected from among hydroxyl group, amino group, oxetane group, oxazoline, cyclocarbonate, oxazolidinone, and cyclic urea, wherein a combined total number of groups in the selected functional groups is not less than four. As a result, it is possible to provide a water-absorbing agent which is excellent in view of the safety. Further, it is more preferable that the non high molecular compound having four or more functional groups each capable of forming a covalent bond with a carboxyl group is a non high molecular compound having four or more hydroxyl groups. Note that, in the case where the non high molecular compound has a plural kinds of groups, a ratio between the groups is not particularly limited.

In addition, the non high molecular compound may further have at least one polymerizable ethylenical double bond, ion-bondable functional group, or the like as long as the non high molecular compound has four or more functional groups each capable of forming a covalent bond with a carboxyl group.

Moreover, the non high molecular compound is not particularly limited if it has four or more functional groups each capable of forming a covalent bond with a carboxyl group. However, the number of the functional groups each capable of forming a covalent bond with a carboxyl group is preferably 4 to 50, more preferably 4 to 20, still more preferably 4 to 10, particularly preferably 4 to 6. The number of carbon atoms of the non high molecular compound is preferably 0.5 to 4 times as many as the number of the functional groups each capable of forming a covalent bond with a carboxyl group, more preferably 1 to 2 times. In the case where the number of such a functional groups is less than 4 or exceeds 50, the liquid permeability poorly enhances.

Specifically, examples of the non high molecular compound having four or more hydroxyl groups include: polyhydric alcohol such as polyglycerol or pentaerythritol; sugar alcohol such as erythritol, xylitol, sorbitol, mannitol, maltitol, lactitol, or oligosaccharide alcohol; aldose such as xylose, glucose, gulose, mannose, or idose; and ketose such as fructose or sorbose. Examples of the non high molecular compound having four or more amino groups include triethylenetetramine, tetraethylenepentamine, and pentaethylenehexamine. Examples of the non high molecular compound having hydroxyl group and amino group include 2-amino-2-hydroxymethyl-1,3-propanediol, and N,N-bis-(2-hydroxyethyl)ethylenediamine. These non high molecular compounds having four or more functional groups each capable of forming a covalent bond with a carboxyl group may be used either alone respectively or in combinations with each other.

Above all, the non high molecular compound having four or more functional groups each capable of forming a covalent bond with a carboxyl group is more preferably the non high molecular compound having four or more hydroxyl groups; more preferably sugar alcohol; still more preferably erythritol, xylitol, or sorbitol; particularly preferably xylitol or sorbitol; most preferably sorbitol. These substances are preferable in view of their extremely high safety.

Besides, the non high molecular compound having four or more functional groups each capable of forming a covalent bond with a carboxyl group is water-soluble such that it dissolves in amount of not less than 0.1 g, more preferably not less than 1 g, still more preferably not less than 10 g, in pure water of 100 g at a room temperature from the view points that it can be added easily and realize uniform crosslinking.

Further, as to the non high molecular compound having four or more functional groups each capable of forming a covalent bond with a carboxyl group, its molecular weight is not particularly limited, but preferably not more than 5000, more preferably not more than 2000, still more preferably not more than 1000, particularly preferably not more than 500, most preferably not more than 200. Still further, a lower limit of the molecular weight of the non high molecular compound having four or more functional groups each capable of forming a covalent bond with a carboxyl group is not particularly limited, but preferably 50, more preferably 80, still more preferably 90. It is not preferable that the molecular weight of the non high molecular compound is greater than 5000 or smaller than 50 since the internal crosslinking is not carried out more efficiently. Further, it is not preferable to use polyvinyl alcohol, starch, or the like as a high molecular compound since the obtained water-absorbent resin has low property and there may occur coloring during drying.

Further, as to the non high molecular compound having four or more functional groups each capable of forming a covalent bond with a carboxyl group, its functional group equivalent weight is preferably not less than 20 and not more than 200 g/mol, more preferably not less than 30 and not more than 100 g/mol. The functional group equivalent weight refers to a value obtained by dividing the molecular weight of the non high molecular compound by the number of "functional groups each capable of forming a covalent bond with a carboxyl group" in the non high molecular compound. It is not preferable that the functional group equivalent weight is greater 200 g/mol or smaller than 20 g/mol since the internal crosslinking is not efficiently carried out.

Note that, as to the non high molecular compound, part of the functional groups may be modified as long as four or more free functional groups each of which is capable of forming a covalent bond with a carboxyl group remain. However, in view of the obtained water-absorbent resin's hydrophilicity, property, safety, and coloring after the heat treatment, it is preferable to use the non high molecular compound whose functional groups are not modified.

Note that, it is preferable to arrange the non high molecular compound so as to have a covalent bond with the inside of the water-absorbent resin and crosslink the inside of the water-absorbent resin. Note that, it is preferable that the functional group forms a covalent bond with a carboxyl group of the water-absorbent resin, but all the functional groups do not necessarily form a covalent bond with a carboxyl group of the water-absorbent resin. Part of the functional groups may be free without forming covalent bond with a carboxyl group of the water-absorbent resin. Further, part of or whole the non high molecular compound having four or more functional groups as used may exist without reacting (i.e. none of the functional groups forms bonds).

Suppose that a non high molecular compound having four or more functional groups each capable of forming a covalent bond with a carboxyl group is a non high molecular compound A, and that the non high molecular compound A in which none of the functional groups form a covalent bond with a carboxyl group of the water-absorbent resin is an unreacted compound A. The unreacted compound A can be extracted from the water-absorbent resin so as to be quantified by analysis in the Liquid Chromatography (LC) or the other method. An extraction method is not particularly limited and may be selected appropriately from among the conventionally known extraction methods. For example, 1 g of the water-absorbent resin is stirred in 0.9 weight % of aqueous sodium chloride solution for two or more hours, and thereafter the resultant aqueous sodium chloride solution is filtered so that an extract obtained as a filtrate is analyzed in the Liquid Chromatography (LC). Here, an amount of the non high molecular compound extracted in the foregoing manner is 0 to 100 weight %, more preferably 10 to 50 weight %, relative to the entire amount of the non high molecular compound used.

Suppose that the non high molecular compound A in which at least one of the four functional groups forms bond with a carboxyl group is a reacted compound A. The reacted compound A can be quantified in the following manner: after extracting the unreacted compound A in the foregoing manner, the water-absorbent resin is hydrolyzed, and the crosslinked point or the reaction point is cut off, and then the non high molecular compound contained in the resultant liquid is analyzed in the Gas Chromatography-Mass Spectrometry (GC-MS), the Liquid Chromatography-Mass Spectrometry, or the other method.

In the water-absorbing agent according to the present invention, the unreacted non high molecular compound whose functional group has no bond with a carboxyl group of the water-absorbent resin corresponds to an entire amount or a partial amount of the non high molecular compound used. With respect to the amount of the water-absorbing agent, the amount of the unreacted non high molecular compound is preferably 100 ppm or more, more preferably 150 ppm or more, still more preferably 200 ppm or more. The presence of the unreacted non high molecular compound whose amount is 100 ppm or more enhances the liquid permeability though the reason thereof is not clearly known. Note that, an upper limit of the amount of the unreacted non high molecular compound included in the water-absorbing agent is generally 10000 ppm, preferably 5000 ppm, more preferably 1000 ppm.

In the water-absorbing agent of the present invention, the non high molecular compound is introduced into an inside of the water-absorbent resin. That is, the water-absorbent resin is arranged so that (i) its inside has a bond with the non high molecular compound preferably so as to be crosslinked and/or (ii) the unreacted non high molecular compound is included therein. Here, it is possible to confirm that the non high molecular compound having four or more functional groups is introduced into the inside of the water-absorbent resin by comparing the non high molecular compound which exists only in the vicinity of the surface of the water-absorbent resin or the water-absorbing agent with the non high molecular compound which exists inside the water-absorbent resin or the water-absorbing agent. It is possible to easily obtain the amount of the non high molecular compound which exists only in the vicinity of the surface of the water-absorbent resin or the water-absorbing agent by measuring the amount of the non high molecular compound having four or more residual functional groups which compound is included in a liquid remaining after rinsing the water-absorbing agent with alcohol etc. such as ethanol and the like, in accordance with the Liquid Chromatography (LC) or a similar method.

It is possible to obtain the amount of the unreacted non high molecular compound which exists in the water-absorbent resin or the water-absorbing agent in the following manner. For example, the water-absorbent resin or the water-absorbing agent is extracted in 0.9 weight % of aqueous sodium chloride solution, and thereafter the resultant extract is analyzed in the Liquid Chromatography (LC).

Further, it is possible to easily confirm that the inside of the water-absorbent resin is crosslinked (preferably crosslinked in a uniform manner) with the non high molecular compound having four or more functional groups in the following manner. The water-absorbent resin or the water-absorbing agent having been heated at 200° C. for 2 hours with a hot air drier or the like for example is cleaved or ground so as to observe the cleaved or ground portion. In case where also the inside thereof is uniformly colored, it is possible to confirm that the inside of the water-absorbent resin is crosslinked (preferably crosslinked in a uniform manner) with the non high molecular compound having four or more functional groups.

As to the water-absorbent resin used in the present invention, at least a non high molecular compound having four or more functional groups each capable of forming a covalent bond with a carboxyl group (first crosslinking agent) is introduced into an inside of the water-absorbent resin but, in addition to the internal crosslinking based on the first crosslinking agent or instead of the internal crosslinking agent based on the first crosslinking agent, the water-absorbent resin may have an internal crosslinked structure based on an internal crosslinking agent other than the non high molecular compound. Examples of the internal crosslinked structure include: a structure obtained by self-crosslinking without any crosslinking agent; and a structure obtained by copolymerization or reaction with an internal crosslinking agent having at least two, more preferably two to four polymerizable ethylenical double bonds per molecule (second crosslinking agent) and/or an internal crosslinking agent other than high molecular compound which internal crosslinking agent has at least two, more preferably two to four functional groups per molecule (third crosslinking agent). The functional groups are highly reactive groups in a molecule and includes a covalent-bondable functional group and an ion-bondable functional group. Above all, in the water-absorbent resin used in the present invention, it is preferable to use (i) a non high molecular compound having four or more functional groups each capable of forming a covalent bond with a carboxyl group (first crosslinking agent) and both/either (ii) an internal crosslinking agent having two or more polymerizable ethylenical double bonds (second crosslinking agent) and/or (iii) an internal crosslinking agent other than the non high molecular compound which internal crosslinking agent has two or more functional groups (third internal crosslinking agent) in combination. That is, it is more preferable to adopt two-kind internal crosslinking or three-kind internal crosslinking. Further, it is further more preferable that the water-absorbent resin used in the present invention uses at least both (1) the non high molecular compound (first crosslinking agent) having four or more functional groups each capable of forming a covalent bond with a carboxyl group and (2) an internal crosslinking agent (second crosslinking agent) having two or more polymerizable ethylenical double bonds per molecule, that is, it is further more preferable that the water-absorbent resin used in the present invention has two-kind internal crosslinking agent. This is preferable since the gel strength after the polymerization is enhanced, and its handling characteristics and properties of the water-absorbing agent are improved.

Specific examples of the second crosslinking agent, i.e., the internal crosslinking agent having two or more polymerizable ethylenical double bonds per molecule include N,N'-methylenebis(meth)acrylamide, (poly)ethylene glycol di(meth)acrylate, (poly)propylene glycol di(meth)acrylate, trimethylolpropane tri(meth)acrylate, trimethylolpropane di(meth)acrylate, glycerol tri(meth)acrylate, glycerol acrylate methacrylate, ethylene-oxide-denatured trimethylolpropane tri(meth)acrylate, pentaerythritol hexa(meth)acrylate, triallyl cyanurate, triallyl isocyanurate, triallyl phosphate, triallylamine, and poly(meth)allyloxyalkanes. It is general to use 0 to 10 mol %, more preferably 0.001 mol % to 0.3 mol %, of each of these polymerizable crosslinking agents with respect to the unsaturated monomer having a carboxyl group in crosslinking. After the polymerization, the amount becomes substantially N.D. (not more than 1 ppm which is a detection limit) by being used for the crosslinking.

In addition, besides, as examples of the third crosslinking agent, i.e., an internal crosslinking agent other than the non high molecular compound which internal crosslinking agent has two or more functional groups, i.e., an internal crosslinking agent other than the non high molecular compound which internal crosslinking agent has two or more covalent-bondable or ionic-bondable functional groups, there can also be cited: polyhydric alcohols such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, 2-aminoethanol, diethanolamine, triethanolamine, polyoxypropylene, oxyethylene-oxypropylene block copolymers; multivalent metallic compounds such as hydroxides and chlorides of zinc, calcium, magnesium, aluminum, iron, or zirconium; (poly)ethyleneglycoldiglycidyl ether; glyceroldiglycidyl ether; ethylenediamine; ethylenecarbonate; propylenecarbonate; glycidyl (meth)acrylate; and the like.

These internal crosslinking agents (the second crosslinking agent and the third crosslinking agent) may be used either alone respectively or in combinations with each other.

The water-absorbent resin used in the present invention may be arranged in any manner as long as a non high molecular compound having four or more functional groups each capable of forming a covalent bond with a carboxyl group is introduced into an inside of the water-absorbent resin. However, it is more preferable that its surface is crosslinked.

Various agents can be used as the surface crosslinking agent for carrying out the surface crosslinking. However, from the view point of properties, favorable examples of the surface crosslinking agent include organic surface crosslinking agents (fourth crosslinking agents) such as: a polyhydric alcohol compound; an epoxy compound; a polyamine compound; a polyamine condensation product of a haloepoxy compound; an oxazoline compound; a monooxazolidinone compound; a dioxazolidinone compound; a polyoxazolidinone compound; a multivalent metal salt; and an alkylenecarbonate compound. Specifically, it is possible to use surface crosslinking agents mentioned in U.S. Pat. No. 6,228,930, U.S. Pat. No. 6,071,976, U.S. Pat. No. 6,254,990, and other documents. More specific examples thereof include: polyhydric alcohol compounds such as ethylene glycol, diethylene glycol, triethylene glycol, tetraethylene glycol, polyethylene glycol, 1,2-propyleneglycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexanedimethanol; epoxy compounds such as ethylene glycol diglycidyl ether, and glycidol); polyamine compounds such as ethylenediamine, diethylenetriamine, triethylenetetramine, tetraethylenepentamine, pentaethylenehexamine, polyethylenimine, polyamide-polyamine; polyamine compounds such as polyamide-polyamine; haloepoxy compounds such as epichlorohydrin, epibromohydrin, and α-methylepichlorohydrin; the polyamine condensation product of a haloepoxy compound; oxazolidinone compounds (U.S. Pat. No. 6,559,239) such as 2-oxazolidinone; oxetane compounds; cyclic urea compounds; and alkylenecarbonate compounds (U.S. Pat. No. 5,409,771) such as ethylenecarbonate. However, the surface crosslinking agent is not limited to them. In order maximize the effect of the present invention, it is preferable to use at least one of the oxetane compound (U.S. Unexamined Patent Publication 2002/72471), the cyclic urea compound, and the polyhydric alcohol, and it is more preferable to use at least either an oxetane compound having three to ten carbon atoms or a polyhydric alcohol having two to ten carbon atoms, and it is further more preferable to use a polyhydric alcohol having three to eight carbon atoms. Further, it is preferable to use also a method in which the surface crosslinking is carried out with a monomer containing the crosslinking agent (Japanese Patent No. 2530668), a method in which the surface crosslinking is carried out with a radical initiator (Japanese Unexamined Patent Publication No. 99211/1988), and a method in which the surface crosslinking is carried out with a radical initiator and a monomer (US 2005-0048221). Thus, in case where the water-absorbent resin used in the present invention is crosslinked with the non high molecular compound (the first crosslinking agent), above-described other internal crosslinking agent (the second crosslinking agent and/or third crosslinking agent), and the surface crosslinking agent, preferably the organic surface crosslinking agent (the fourth crosslinking agent), it is possible to obtain a water-absorbent resin having three or more kinds of crosslinked structures including the internal crosslinking and the surface crosslinking.

Further, the surface crosslinking agent for carrying out the surface crosslinking may be an inorganic surface crosslinking agent (fifth crosslinking agent). More specifically, a preferable example of the inorganic surface crosslinking agent (fifth crosslinking agent) is an inorganic surface crosslinking agent which will be described in (1-2).

The surface crosslinking agent may be solely used, or may be used in combination with two or more surface crosslinking agents. Further, a combination of the organic surface crosslinking agent (fourth crosslinking agent) and the inorganic crosslinking agent (fifth crosslinking agent) may be used. As a result, in case where the water-absorbent resin is crosslinked with the non high molecular compound (first crosslinking agent), other internal crosslinking agent (second crosslinking agent and/or third crosslinking agent), the organic surface crosslinking agent (fourth crosslinking agent), and the inorganic surface crosslinking agent (fifth crosslinking agent), it is possible to obtain the water-absorbent resin having four or more kinds of crosslinking as internal crosslinking and surface crosslinking. As the water-absorbing agent using the water-absorbent resin having four or more kinds of crosslinking, it is preferable to use a water-absorbing agent including as a main component a water-absorbent resin having a crosslinked structure obtained by polymerizing an unsaturated monomer having a carboxyl group, wherein an inside of the water-absorbent resin is crosslinked with a non high molecular compound having four or more functional groups each capable of forming a covalent bond with a carboxyl group and an internal crosslinking agent having two or more polymerizable ethylenical double bonds per molecule, and a surface of the water-absorbent resin is crosslinked with an organic surface crosslinking agent and an inorganic surface crosslinking agent.

Further, as described in Patent Document 12, at least the surface of the water-absorbent resin used in the present invention may have tetravalent or further multivalent polyol and, if necessary, trivalent or further multivalent polycation. As a result, the wettability of a particulate water-absorbent resin composition is exhibited.

(1-2) Components Other than the Water-Absorbent Resin

The water-absorbing agent according to the present invention contains the water-absorbent resin as a main component and contains a small amount of additive and/or water if necessary. It is preferable that the water-absorbing agent of the present invention contains a liquid-permeability-enhancement agent. As a result, it is possible to enhance the liquid permeability. In the present specification, the liquid-permeability-enhancement agent herein refers to an agent which enhances an SFC of water-absorbent resin or water-absorbing agent having an SFC of not less than 1 by at least 10.

Mixture of the liquid-permeability-enhancement agent with the water-absorbent resin or water-absorbing agent, holds a liquid permeation path for the water-absorbent resin or water-absorbing agent after having absorbed the aqueous liquid in a physical manner or ionized manner, and thus makes it possible to increase liquid permeability.

Examples of the liquid-permeability-enhancement agent include: water-soluble multivalent metal compounds such as aluminum sulfate, potassium alum, ammonium alum, sodium alum, (poly)aluminum chloride, and their hydrates; polycationic compounds such as polyethylenimine, polyvinylamine, polyallylamine; and water-insoluble inorganic fine particles such as silica, alumina, and bentonite. These may be used either alone respectively or in combinations with each other. Above all, water-soluble multivalent metal salts such as aluminum sulfate, and potassium alum are preferable since each of these substances serves as a crosslinking agent (fifth crosslinking agent: inorganic surface crosslinking agent) and allows enhancement of the saline flow conductivity (SFC) more than that in a case of adding no water-soluble multivalent metal salts.

The liquid-permeability-enhancement agent is used in an amount of preferably 0.001 to 10 weight %, more preferably 0.01 to 5 weight %, relative to the water-absorbent resin.

Note that, the liquid-permeability-enhancement agent is not limited if it enhances liquid permeability, but preferably a substance which forms no covalent bonds with functional groups on the surface of the water-absorbent resin.

Further, the water-absorbing agent according to the present invention may further include, if necessary, another additive in such a range that water-absorption characteristics such as liquid permeability of the water-absorbing agent do not decrease. Examples of the another additive include: deodorizer, antimicrobial agent, fragrant material, blowing agent, pigment, dye, plasticizer, adhesive, surfactant, fertilizer, oxidizer, reducer, water, salts, chelating agent, bactericidal agent, hydrophilic polymer such as polyethyleneglycol, paraffin, hydrophobic polymer, thermoplastic resin such as polyethylene and polypropylene, and thermosetting resin such as polyester resin and urea resin. For example, the water-absorbing agent according to the present invention may further include the another additive of the order of 0 to 10 weight %, relative to the water-absorbent resin.

Further, the water-absorbing agent of the present invention may include inorganic powder as the additive, but it is preferable to add the inorganic power in such a range that water-absorption characteristics such as liquid permeability of the water-absorbing agent do not decrease. Specific examples of the inorganic powder include: metal oxide such as silicon dioxide and titanium oxide; silicate acid (salt) such as natural zeolite and synthetic zeolite; kaolin; talc; clay; and bentonite. Among them, silicon dioxide and silicate (salt) are preferable, and silicon dioxide and silicate (salt) each of which has an average particle diameter of not more than 200 μm based on measurement by Coulter Counter Method are more preferable. The amount of the inorganic powder varies depending on a composition of the water-absorbent resin and/or water-absorbing agent. However, for example, the amount of the inorganic powder preferably ranges from 0 weight % to 0.5 weight %, more preferably from 0 weight % to 0.3 weight %, still more preferably from 0 weight % to 0.1 weight %, particularly preferably from 0 weight % to 0.05 weight %, with respect to the water-absorbent resin. It is not preferable that the amount of the solid-particulate inorganic powder is larger than 0.5 weight parts since it is difficult to obtain the aforementioned water absorbing article such as a diaper having uniform performances.

(1-3) Shape and Particle Diameter of the Water-Absorbent Resin and the Water-Absorbing Agent The shape of the water-absorbent resin used in the present invention and the water-absorbing agent of the present invention is not particularly limited. However, in achieving the present invention, it is preferable that the shape is particulate, and it is more preferable that the shape is adjusted to be a specific particle diameter. As to the particle diameter of the water-absorbent resin usable in the present invention and the water-absorbing agent of the present invention, an amount of particles whose particle diameter is less than 850 μm and not less than 150 μm (defined by classification with a sieve: JIS Z8801-1: 2000) is preferably not less than 90 weight % and 100 weight % (upper limit), more preferably not less than 95 weight %, still more preferably not less than 98 weight %, with respect to the entire amount. Further, it is preferable that an amount of particles whose particle diameter is not less than 300 μm is not less than 60 weight % with respect to the entire amount. Note that, the "entire amount" means an entire amount of the particulate water-absorbent resin in referring to the particle diameter of the water-absorbent resin and means an entire amount of the water-absorbing agent in referring to the particle diameter of the water-absorbing agent.

Further, a weight-average particle diameter (D50) of the water-absorbent resin or the water-absorbing agent preferably ranges from 200 μm to 850 μm, more preferably from 200 μm to 600 μm, still more preferably from 300 μm to 600 μm, particularly preferably from 300 μm to 500 μm, most preferably from 350 μm to 450 μm. The particle diameter of the water-absorbent resin and the water-absorbing agent may be adjusted by granulation if required.

Further, the particulate shape of the water-absorbent resin or the water-absorbing agent is not particularly limited. Examples of the particulate shape includes a spherical shape, a pulverized shape, an irregular shape, and the like. It is preferable that the particulate shape is an irregularly pulverized shape obtained by carrying out the pulverizing step. In addition, the water-absorbent resin or the water-absorbing agent preferably has a bulk density (defined by JIS K-3362: 1998) in the range of 0.40 to 0.80 g/ml, more preferably 0.50 to 0.75 g/ml, still more preferably 0.60 to 0.73 g/ml.

In the water-absorbent resin or the water-absorbing agent of the present invention, a logarithmic standard deviation ($\sigma\zeta$) of particle diameter distribution is preferably in the range of 0.1 to 0.45, more preferably 0.25 to 0.45, still more preferably 0.30 to 0.40. A lower logarithmic standard deviation ($\sigma\zeta$) of particle diameter distribution indicates a narrower particle diameter distribution. In the water-absorbent resin and the water-absorbing agent of the present invention, important is not a simply narrow particle diameter distribution, but a particle diameter distribution that is wide to some extent. In the case where the logarithmic standard deviation (σζ) is less than 0.1, not only the target performances cannot be obtained, but also productivity decreases seriously. In the case where the logarithmic standard deviation (σζ) exceeds 0.45, a particle diameter distribution becomes too wide, and there is a possibility that the target performances might not be obtained.

In the present invention, the "particles whose particle diameter is not less than 300 μm" refer to particles, having been pulverized, which were classified with a JIS standard sieve having a mesh opening size of 300 μm and remain on the sieve. Further, the "particles whose particle diameter is less than 300 μm" refer to particles, having been pulverized, which were classified with a JIS standard sieve having a mesh opening size of 300 μm and passes through the sieve. This is applicable to other mesh opening sizes. In case where 50 weight % of particles are classified with a mesh whose opening size is 300 μm, the weight-average particle diameter (D50) is 300 μm.

Note that, the particle diameter is suitably adjusted by polymerization, pulverization of wet polymerized resultant (referred to also as segmentation of wet polymerized resultant), drying, pulverizing, classification, granulation, mixture of plural water-absorbent resin particles, or a similar operation.

(1-4) Water-Absorption Characteristics of the Water-Absorbing Agent of the Present Invention In the water-absorbing agent of the present invention, it is preferable that its absorbency (CRC) is more than 25 g/g. This allows aqueous liquid to be favorably absorbed and retained in using the water-absorbing agent of the present invention for a sanitary material such as a diaper and the like. The present invention is to allow enhancement of the liquid permeability without dropping the absorbency and is to provide a water-absorbing agent having high liquid permeability also in case where the absorbency (CRC) is more than 25 g/g. Of course, the absorbency (CRC) may be not more than 25 g/g as long as the absorbency is not less than 5 g/g. However, in view of the performance for absorbing and retaining the aqueous liquid, the absorbency (CRC) is preferably not less than 25 g/g and not more than 50 g/g, more preferably not less than 26 g/g and not more than 40 g/g, particularly preferably not less than 27 g/g and not more than 35 g/g, most preferably not less than 28 g/g and not more than 35 g/g. It is not preferable that the absorbency (CRC) is less than 25 g/g since a larger amount of the water-absorbing agent has to be used. Note that, in the present invention, the "absorbency" is a synonymous of "water absorption capacity".

The absorbency (CRC) can be controlled by adjusting conditions of polymerization and crosslinking. The absorbency (CRC) varies depending on a type of the monomer, a type of the crosslinking agent, and a similar condition, but the absorbency (CRC) can be controlled by adjusting an amount of the non high molecular compound (first crosslinking agent) having four or more functional groups each capable of forming a covalent bond with a carboxyl group and an amount of the crosslinking agent (second crosslinking agent) having two or more polymerizable ethylenical double bonds. Here, in adjusting the amount of the non high molecular compound used therein, it is necessary to consider a neutralization ratio of the carboxyl group since the bond of the non high molecular compound and the carboxyl group depends on the neutralization ratio of the carboxyl group in the water-absorbent resin. In consideration of the neutralization ratio, the amount of the non high molecular compound which is required so that the absorbency (CRC) exceeds 25 g/g can be represented as a relational expression with respect to the neutralization ratio.

That is, an amount (Y) (mol %) of the non high molecular compound as used, relative to the unsaturated monomer having a carboxyl group, is expressed by the following equation (1): $Y < 0.06/\{2-(2.35X/100)\}$ ... (1) where X is neutralization ratio (mol %) of a carboxyl group in the water-absorbent resin and is preferably in the range of 45 to 85 mol %.

The water-absorbing agent of the present invention exhibits a saline flow conductivity (SFC: an index for evaluating the liquid permeability) of not less than 30 $cm^3 \cdot s \cdot 10^{-7}/g$, preferably not less than 40 $cm^3 \cdot s \cdot 10^{-7}/g$, more preferably not less than 45 $cm^3 \cdot s \cdot 10^{-7}/g$, still more preferably not less than 50 $cm^3 \cdot s \cdot 10^{-7}/g$, particularly preferably not less than 55 $cm^3 \cdot s \cdot 10^{-7}/g$, most preferably not less than 60 $cm^3 \cdot s \cdot 10^{-7}/g$. Its upper limit value is not particularly limited, but the upper limit value is preferably not more than 400 $cm^3 \cdot s \cdot 10^{-7}/g$, more preferably not more than 300 $cm^3 \cdot s \cdot 10^{-7}/g$, still more preferably not more than 200 $cm^3 \cdot s \cdot 10^{-7}/g$. In case where the saline flow conductivity (SFC) is less than 30 $cm^3 \cdot s \cdot 10^{-7}/g$, this may cause, for example, the following disadvantage: an aqueous solution such as urine is hardly diffused in an absorbent structure, so that the aqueous solution is hardly absorbed by the absorbent structure, which results in leakage.

Note that, the "liquid permeability" in the present invention means the water-absorbing agent's liquid permeation performance under pressure after the water-absorbing agent absorbs water and swells under pressure. That is, the "liquid permeability" means liquid permeability between swollen gel particles under pressure. This serves as a liquid permeation model in practical use for a diaper.

In the water-absorbing agent of the present invention, it is preferable that its absorbency against pressure (AAP) is not less than 15 g/g. This allows aqueous liquid to be favorably absorbed and retained in using the water-absorbing agent of the present invention for a sanitary material such as a diaper and the like. The present invention is to allow enhancement of the liquid permeability without dropping the absorbency and is to provide a water-absorbing agent having high liquid permeability also in case where the absorbency against pressure (AAP) is more than 15 g/g. Of course, the absorbency against pressure (AAP) may be not more than 15 g/g as long as the absorbency against pressure (AAP) is not less than 5 g/g. However, in view of the performance for absorbing and retaining the aqueous liquid, the absorbency against pressure (AAP) is preferably not less than 15 g/g and not more than 30 g/g, more preferably not less than 19 g/g and not more than 30 g/g, particularly preferably not less than 20 g/g and not more than 28 g/g. It is not preferable that the absorbency against pressure (AAP) is smaller than 5 g/g since the water-absorbing agent must be used in a large amount. Further, in case where the absorbency against pressure (AAP) is less than 15 g/g, when a load such as a body weight is exerted onto the particulate water-absorbent resin composition, both the liquid diffusing ability and the absorbing ability drop, so that the liquid is not diffused in the absorbent structure and/or the sanitary material, which results in the blocking. This raises problems such as leakage, skin eruption, and the like on the occasion of the practical use in a disposable diaper.

In the water-absorbing agent of the present invention, an absorption rate (FSR) is preferably not less than 0.05 g/g/s, more preferably not less than 0.1 g/g/s, still more preferably not less than 0.15 g/g/s, particularly preferably not less than 0.17 g/g/s. An upper limit thereof is not particularly limited but is preferably not more than 5.0 g/g/s, more preferably not more than 3.0 g/g/s. In case where the absorption rate (FSR)

is smaller than 0.05 g/g/s, urine is not sufficiently absorbed and leaks on the occasion of the use in a diaper for example.

Further, the water-absorbing agent of the present invention preferably has a solid content in the range of 70 to 99.8 weight %, more preferably 80 to 99.5 weight %, still more preferably 85 to 99 weight %, particularly preferably 90 to 99 weight %. In case where the solid content is smaller than 80 weight %, the absorbency may drop. In case where the solid content is larger than 99.5 weight %, the powder may less absorb a shock, and the liquid diffusion rate or the absorption rate may drop.

The water-absorbing agent of the present invention is arranged so that a surface tension of water-absorbing agent dispersion liquid obtained by dispersing 0.5 g of the water-absorbing agent in 50 ml of physiological saline is preferably not less than 55 mN/m, more preferably not less than 60 mN/m, still more preferably not less than 65 mN/m, particularly preferably not less than 68 mN/m, most preferably not less than 70 mN/m. Further, an upper limit of the surface tension of the water-absorbing agent dispersion liquid is not particularly limited but is preferably 85 mN/m, more preferably 80 mN/m, still more preferably 78 mN/m. It is not preferable that the surface tension is lower than 55 mN/m since the liquid diffusing ability drops when the water-absorbing agent is used in a sanitary material such as a diaper.

(1-5) Usage of the Water-Absorbing Agent of the Present Invention

The water-absorbing agent of the present invention is superior in water-absorption characteristics such as liquid permeability and absorbency. Thus, as absorption/solidification agent (absorption/gelatinization agent) for aqueous liquid such as urine and blood, the water-absorbing agent is favorably used in sanitary materials such as a child diaper, a sanitary napkin, a so-called incontinence pad, and the like.

In constituting the sanitary material, the water-absorbing agent of the present invention ordinarily in a particulate shape is combined with a hydrophilic fiber and is molded so as to be used as an absorbent structure. With respect to a total weight of the water-absorbing agent and the hydrophilic fiber, an amount (core concentration) of the water-absorbing agent contained in the absorbent structure preferably ranges from 20 to 100 weight %, more preferably from 30; to 100 weight %, still more preferably from 40 to 100 weight %, particularly preferably from 50 to 100 weight %. In case where the core concentration is less than 20 weight %, it is difficult to make use of properties of the water-absorbing agent.

The absorbent structure is preferably obtained by carrying out compression molding so that its density ranges from 0.06 to 0.50 g/cc, its basic weight ranges from 0.01 to 0.20 g/cm$^2$. Note that, examples of the fiber base material include: hydrophilic fibers such as crushed wood pulp; cotton linter or crosslinked cellulose fiber; rayon; cotton; sheep wool; acetate; vinylon; and the like. It is preferable to carry out an air-laid process with respect to these materials.

Further, the water-absorbing agent according to the present invention is widely applicable not only to the sanitary materials but also to conventional usages of the water-absorbent resin, e.g., agriculture/horticulture, cable water proofing agent, civil engineering and construction, and food products.

(2) Method According to the Present Invention for Producing a Water-Absorbing Agent The method according to the present invention for producing a water-absorbing agent is not particularly limited as long as the method allows production of a water-absorbing agent including, as a main component, a water-absorbent resin having a crosslinked structure obtained by polymerizing an unsaturated monomer having a carboxyl group, wherein at least a non high molecular compound having four or more functional groups each capable of forming a covalent bond with a carboxyl group is introduced into an inside of the water-absorbent resin.

The method according to the present invention for producing the water-absorbing agent may be arranged in any manner as long as, for example, the method includes at least: (2-1) a polymerization step in which the unsaturated monomer having a carboxyl group and included in an aqueous monomer solution is polymerized in the presence of at least the non high molecular compound having four or more functional groups each capable of forming a covalent bond with a carboxyl group, so as to obtain a hydropolymer; and (2-3) a drying step in which the hydropolymer obtained in the polymerization step is dried so as to obtain the water-absorbent resin.

As other production method, the non high molecular compound is dissolved in a large amount of water (whose weight is 1 to 300 times, more preferably, 3 to 300 times as large as a weight of the water-absorbent resin for example) may be absorbed by a dried water-absorbent resin or a hydrogel of the water-absorbent resin, and the non high molecular compound may be kneaded into the hydrogel of the water-absorbent resin by a kneader or a meat chopper. Preferably, the non high molecular compound is made to exist in the polymerization step as described above, so that it is possible to uniformly introduce the non high molecular compound into the whole water-absorbent resin. Note that, any arrangement may be made as long as the non high molecular compound is introduced into the inside of the water-absorbent resin, and distribution of the non high molecular compound in the inside of the water-absorbent resin may be such that a micro domain is uniformly distributed or may be such that the non high molecular compound is uniformly introduced at a molecular level. Above all, it is more preferable that the non high molecular compound is uniformly introduced at a molecular level.

Further, the method according to the present invention for producing a water-absorbing agent may further include: (2-2) an aqueous monomer solution preparation step in which the aqueous monomer solution containing (i) the unsaturated monomer having a carboxyl group and (ii) at least the non high molecular compound is prepared before carrying out the polymerization step; (2-4) a pulverization step in which the hydropolymer or the water-absorbent resin obtained is pulverized at least before or after the drying step; (2-5) a surface crosslinking step in which a surface of the water-absorbent resin is crosslinked; and (2-6) a liquid-permeability-enhancement agent adding step in which a liquid-permeability-enhancement agent is added. The respective steps are described as follows.

(2-1) Polymerization Step

In the present step, the unsaturated monomer having a carboxyl group and included in a aqueous monomer solution is polymerized in the presence of at least the non high molecular compound having four or more functional groups each capable of forming a covalent bond with a carboxyl group, so as to obtain a hydropolymer.

As to an amount of usage of the non high molecular compound having four or more functional groups each capable of forming a covalent bond with a carboxyl group, the amount of usage (Y) (unit: mol %) of the non high molecular compound having four or more functional groups each capable of forming a covalent bond with a carboxyl group, relative to the unsaturated monomer having a carboxyl group, is preferably in the range expressed by the following equation (1):

$$Y < 0.06 / \{2 - (2.35X/100)\} \qquad (1).$$

In the equation (1), X is a neutralization ratio (mol %) of a carboxyl group in the water-absorbent resin, and preferably in the range of 45 mol % to 85 mol %.

As to the unsaturated monomer having a carboxyl group, the description of (1-1) is applicable.

Further, in the present step, in combination with the unsaturated monomer having a carboxyl group, other monomer described in (1-1) may be copolymerized if required. In case of copolymerizing other monomer, the aqueous monomer solution including the unsaturated monomer having a carboxyl group may further contain other monomer described in (1-1) in addition to the unsaturated monomer having a carboxyl group. Hereinafter, a monomer included in the aqueous monomer solution is referred to merely as a monomer. That is, hereinafter, (a) the unsaturated monomer having a carboxyl group in case where other monomer is not used or (b) the unsaturated monomer having a carboxyl group and other monomer in case where other monomer is used is referred to merely as a monomer.

The monomer in the aqueous monomer solution is polymerized in the present step and the non high molecular compound having four or more functional groups each capable of forming a covalent bond with a carboxyl group as described in (1-1) is introduced into an inside of the water-absorbent resin.

The amount of the non high molecular compound having four or more functional groups each capable of forming a covalent bond with a carboxyl group (first crosslinking agent) is as described above. For example, when the neutralization ratio of the carboxyl group in the water-absorbent resin is 45 mol %, the amount is preferably less than 0.064 mol % with respect to the unsaturated monomer having a carboxyl group. For example, when the neutralization ratio of the carboxyl group in the water-absorbent resin is 85 mol %, it is preferable that the amount is preferably less than 24 mol % with respect to the unsaturated monomer having a carboxyl group.

Further, a lower limit of the amount of the non high molecular compound having four or more functional groups each capable of forming a covalent bond with a carboxyl group is preferably 0.001 mol %, more preferably 0.002 mol %, still more preferably 0.005 mol %, particularly preferably 0.01 mol %, most preferably 0.02 mol %, with respect to the unsaturated monomer having a carboxyl group. In case where the amount of the non high molecular compound is less than 0.001 mol %, it is impossible to sufficiently exhibit the effects of the present invention, so that the water-absorption characteristics are not favorably balanced. Thus, such amount is not preferable. Further, in case where the amount of the non high molecular compound deviates from the range defined by the foregoing equation (1), the absorbency (CRC) drops. Thus, such amount is not preferable.

Further, the monomer of the aqueous monomer solution may be polymerized in the presence of (1) the non high molecular compound and (2) the internal crosslinking agent (second crosslinking agent) having two or more polymerizable ethylenical double bonds described in (1-1) and/or the internal crosslinking agent (third crosslinking agent) other than the high molecular compound which internal crosslinking agent has two or more functional groups in order that the monomer is further internally crosslinked by these internal crosslinking agents (the second crosslinking agent and/or the third crosslinking agent) other than the non high molecular compound. A ratio of an amount of the first crosslinking agent and an amount of the second crosslinking agent and/or the third crosslinking agent which are used together [(amount of the first crosslinking agent): (amount of the second crosslinking agent and/or the third crosslinking agent)] preferably ranges from 1:9 to 9:1 in a molar ratio. In view of handling characteristics of the polymerized gel, it is more preferable that the amount of the first crosslinking agent is smaller than the amount of the second crosslinking agent and/or the third crosslinking agent.

With respect to the unsaturated monomer having a carboxyl group (excluding the crosslinking agent), the total amount of these internal crosslinking agents other than the non high molecular compound (second crosslinking agent and/or third crosslinking agent) is preferably not less than 0 and not more than 1.0 mol %, more preferably not less than 0 and not more than 0.5 mol %, still more preferably not less than 0 and not more than 0.2 mol %, particularly preferably not less than 0.005 mol % and not more than 0.1 mol %, most preferably not less than 0.01 mol % and less than 0.1 mol %. In case where the total amount of the internal crosslinking agent other than the non high molecular compound is more than 1.0 mol %, the absorbency (CRC) drops. Thus, such amount is not preferable.

Above all, it is preferable to additionally use the internal crosslinking agent (second crosslinking agent) having two or more polymerizable ethylenical double bonds as other internal crosslinking agent. Further, the polymerizable crosslinking agent (second crosslinking agent) is used for crosslinking. Thus, after the polymerization, the amount is generally substantially N.D. (not more than 1 ppm which is a detection limit). That is, it is more preferable to arrange the present step so as to polymerize the unsaturated monomer having a carboxyl group and contained in the aqueous monomer solution in the presence of the internal crosslinking agent (first crosslinking agent) which is the non high molecular compound having four or more functional groups each capable of forming a covalent bond with a carboxyl group and the internal crosslinking agent (second crosslinking agent) having two or more polymerizable ethylenical double bonds so as to obtain a hydropolymer. Note that, in case of using as the internal crosslinking agent only the internal crosslinking agent based on the covalent bond, the internal crosslinking is carried out by being heated in the drying step or the surface crosslinking step. Further, in case of using as the internal crosslinking agent the internal crosslinking agent having two or more polymerizable ethylenical double bonds, the internal crosslinking is carried out in the polymerization step. Thus, the crosslinked structure is formed in the polymerization step by using the second crosslinking agent together, so that it is possible to obtain a hydrogel which is hard to some extent after the polymerization step, in other words, it is possible to obtain, after the polymerization step, a hydrogel whose gel strength is improved. Therefore, the handling characteristics of the hydrogel is improved. That is, the resultant hydrogel is not excessively soft, so that the hydrogel can be easily crushed or can be easily subjected to a similar process. As a result, it is easy to control the size and the shape of the crushed hydrogel. Further, since it is easy to control the size and the shape of the hydrogel or it is easy to control a surface area size of the water-absorbent resin accordingly, it is possible to improve properties, such as a water absorption rate and the like, of the resultant water-absorbent resin.

In this way, in case of using the internal crosslinking agent which is the non high molecular compound having four or more functional groups each capable of forming a covalent bond with a carboxyl group and the internal crosslinking agent having two or more polymerizable ethylenical double bonds, it is preferable that the amount of the internal crosslinking agent which is the non high molecular compound having four or more functional groups each capable of forming a covalent bond with a carboxyl group is within the aforementioned range. Further, with respect to the unsaturated monomer having a carboxyl group (excluding the crosslinking agent), the amount of the internal crosslinking agent having two or more polymerizable ethylenical double bonds is preferably not less than 0 and not more than 1.0 mol %, more preferably not less than 0 and not more than 0.5 mol %, still more preferably not less than 0 and not more than 0.2 mol %, particularly preferably not less than 0.005 mol % and not more than 0.1 mol %, most preferably not less than 0.01 mol % and less than 0.1 mol %. In case where the amount of other internal crosslinking agent (second crosslinking agent) is more than 1.0 mol %, the absorbency (CRC) drops. Thus, such amount is not preferable.

Note that, the non high molecular compound and other internal crosslinking agent may be added before or during polymerization of the monomer as long as they exist at the time of polymerization of the monomer. Further, these internal crosslinking agents may be added to the reaction system in a single dose or several doses.

In the present step, as an initiator used in polymerizing the monomer, it is possible to use: radical polymerization initiators such as potassium persulfate, ammonium persulfate, sodium persulfate, potassium peracetate, sodium peracetate, potassium percarbonate, sodium percarbonate, t-butyl hydroperoxide, hydrogen peroxide, and 2,2'-azobis(2-amidinopropane)dihydrochloride; photopolymerization initiators such as 2-hydroxy-2-methyl-1-phenyl-propane-1-one; and similar initiators. In view of properties of the resultant water-absorbent resin, the amount of these polymerization initiators as used is in the range of 0.001 to 2 mol %, preferably 0.01 to 0.1 mol % (relative to the entire monomers). In case where the amount of the polymerization initiators is less than 0.001 mol %, a larger amount of unreacted monomer remains. In case where the amount of the polymerization initiators exceeds 2 mol %, it is difficult to control the polymerization. Thus, such amount is not preferable.

Further, in polymerizing the monomer in the present step, it is possible to carry out bulk polymerization or precipitation polymerization. However, in view of properties of the resultant water-absorbent resin, it is preferable to carry out aqueous solution polymerization or reversed-phase suspension polymerization in which the monomer is used in the form of an aqueous solution. The concentration of the monomer contained in the aqueous solution (aqueous monomer solution) in the case where the monomer is used in the form of the aqueous solution is determined depending on temperature of the aqueous solution and a type of the monomer, so that the concentration is not particularly limited. However, for example, in case of carrying out the polymerization (neutralization polymerization) with the unsaturated monomer having a carboxyl group which monomer has been neutralized in advance, the concentration ranges preferably from 10 to 70 mass %, more preferably from 20 to 60 mass %. Further, in carrying out the aqueous solution polymerization, a solvent other than water may be used together if required. A type of the solvent used together is not particularly limited.

In initiating the polymerization, it is possible to initiate the polymerization by using the aforementioned polymerization initiators. In addition to the aforementioned polymerization initiators, active energy rays such as ultraviolet rays, electron beams, and γ rays may be solely used or may be used in combination with the aforementioned polymerization initiators. Temperature in initiating the polymerization depends on a type of the polymerization initiator used, but its upper limit preferably ranges from 15 to 130° C., more preferably from 20 to 120° C.

Note that, the reversed-phase suspension polymerization is a polymerization method which causes the aqueous monomer solution to be suspended in a hydrophobic organic solvent. Such polymerization method is disclosed in such as U.S. Pat. No. 4,093,776, U.S. Pat. No. 4,367,323, U.S. Pat. No. 4,446, 261, U.S. Pat. No. 4,683,274, and U.S. Pat. No. 5,244,735 for example. The aqueous solution polymerization is a polymerization method which causes the aqueous monomer solution to be polymerized without using any dispersion solvent. Such polymerization method is disclosed in such as U.S. Pat. No. 4,625,001, U.S. Pat. No. 4,873,299, U.S. Pat. No. 4,286,082, U.S. Pat. No. 4,973,632, U.S. Pat. No. 4,985,518, U.S. Pat. No. 5,124,416, U.S. Pat. No. 5,250,640, U.S. Pat. No. 5,264, 495, U.S. Pat. No. 5,145,906, U.S. Pat. No. 5,380,808, EP 0811636, EP 0955086, EP 0922717. Also the monomers and the initiators described therein are applicable to the present invention.

<Other Polymerization Method>

In the foregoing polymerization methods, it is general that the polymerization (neutralization polymerization) is carried out by using the unsaturated monomer having a carboxyl group which monomer has been neutralized in advance. However, as other polymerization method, it is possible to adopt a so-called acid polymerization/subsequent neutralization method in which: polymerization is carried out by using, as a main component, the unsaturated monomer having a carboxyl group which monomer has not been neutralized, particularly, by using, as a main component, acrylic acid which has not been neutralized, and the carboxyl group is neutralized after the polymerization.

In such acid polymerization/subsequent neutralization method, the aqueous monomer solution containing as its main component the acrylic acid which has not been neutralized and having a specific concentration is subjected to crosslinking polymerization in the presence of the internal crosslinking agent and then is neutralized, and the resultant is adjusted so as to have a specific particle diameter, and the thus obtained crosslinked polymer having the specific particle diameter and water absorbency is further subjected to surface crosslinking.

According to the acid polymerization/subsequent neutralization method, the crosslinked polymer is obtained by polymerizing the unsaturated monomer which contains as a main component the acrylic acid having not been neutralized so that a molar ratio of the acrylic acid having not been neutralized preferably ranges from 30 to 100 mol %, more preferably from 90 to 100 mol %, particularly preferably 100 mol %, relative to a total acrylic acid. Then, monovalent compound, particularly, alkaline metal compound is added to the thus obtained crosslinked polymer so that part of the crosslinked polymer is monovalent salt, particularly, alkaline metal salt, thereby obtaining a water-absorbent resin used in the present invention.

Note that, as in the foregoing polymerization methods, the acid polymerization/subsequent neutralization method allows use of "other monomer" as necessary in combination with the unsaturated monomer having a carboxyl group. Further, details of types and amounts of the "other monomer", "the non high molecular compound having four or more functional groups each capable of forming a covalent bond with a carboxyl group", "other internal crosslinking agent", and "polymerization initiator" are the same as in the aforementioned polymerization methods.

Note that, the non high molecular compound and other internal crosslinking agent may be added before or during the polymerization of the monomer as long as these components exist at the time of polymerization of the monomer. Further, these internal crosslinking agents may be added to the reaction system in a single dose or several doses.

In the acid polymerization/subsequent neutralization method, the polymerized crosslinked polymer is essentially neutralized. Examples of an alkaline metal compound used to neutralize the carboxyl group of the thus obtained crosslinked polymer so that part of the crosslinked polymer to be alkaline metal salt include: alkaline metal hydroxide (sodium hydroxide, potassium hydroxide, lithium hydroxide, and the like), alkaline metal carbonate (sodium carbonate, sodium hydrogencarbonate, and the like), and a similar substance. Further, it is possible to use amines such as ammonium, alkanolamine, ammonium carbonate, and a similar substance. In view of performance of the resultant water-absorbent resin, industrial availability, and the safety, it is preferable to use sodium salt or potassium salt. In the acid polymerization/subsequent neutralization method, preferably 45 to 85 mol %, more preferably 50 to 85 mol %, still more preferably 55 to 80 mol %, particularly preferably 60 to 75 mol % of the carboxyl group in the crosslinked polymer are neutralized with the alkaline metal compound to be converted into alkaline metal salt. In case where the polymerization is carried out by using a solvent, an example of the method for allowing the hydropolymer obtained through the polymerization to be neutralized with the alkaline metal compound is a method in which: an aqueous solution of the alkaline metal compound is added while cutting the thus obtained hydropolymer into small pieces each having a size of about 1 cm$^3$ or less, and the resultant is kneaded by a kneader or a meat chopper. Further, in obtaining the water-absorbing agent of the present invention, a neutralization temperature preferably ranges from 50 to 100° C., more preferably from 60 to 90° C. As to the neutralization, a first neutralization coefficient (defined as a neutralization degree of 200 particles) recited in claim 1 of U.S. Pat. No. 6,187,872 is preferably 10 or less so as to be uniform.

<Method for Adding a Chain Transfer Agent>

In the method of the present invention for producing the water-absorbing agent, a chain transfer agent may be used at the time of the polymerization. In the presence of not only the monomer, the non high molecular compound having four or more functional groups each capable of forming a covalent bond with a carboxyl group, other internal crosslinking agent, and the polymerization initiator, but also a water-soluble chain transfer agent, the polymerization is carried out, so that it is possible to obtain the water-absorbing agent having high water absorbing ability and excellent stability with respect to urine in case where the water-absorbent resin made of the resultant crosslinked polymer is used for the water-absorbing agent of the present invention.

The water-soluble chain transfer agent used in the polymerization of the present invention is not particularly limited as long as the agent is dissolved in water or the monomer. Examples thereof include thiols, thiolic acids, secondary alcohols, amines, hypophosphites, and the like. Specifically, one kind or two or more kinds selected from a group made up of mercaptoethanol, mercaptopropanol, dodecylmercaptan, thioglycols, thiomalic acid, 3-mercaptopropionic acid, isopropanol, sodium hypophosphite, formic acid, and salts thereof. In view of the effects, it is more preferable to use hypophosphite such as sodium hypophosphite.

An amount of the water-soluble chain transfer agent depends on a type of the water-soluble chain transfer and monomer concentration of the aqueous monomer solution, but the amount is 0.001 to 1 mol %, preferably 0.05 to 0.3 mol % with respect to the entire monomer. In case where the amount is less than 0.001 mol %, the amount of the internal crosslinking agent used in the present invention causes high crosslinking density, which drops the absorbency. Thus, such amount is not preferable. In case where the amount exceeds 1 mol %, a water-soluble content increases, which drops the stability. Thus, such amount is not preferable.

(2-2) Aqueous Monomer Solution Preparation Step

A process for producing a water-absorbing agent according to the present invention may further include an aqueous monomer solution preparation step in which there is prepared an aqueous monomer solution including the unsaturated monomer having a carboxyl group and the non high molecular compound having four or more functional groups each capable of forming a covalent bond with a carboxyl group, before the polymerization step.

The aqueous monomer solution includes at least (i) an unsaturated monomer having a carboxyl group and (ii) a non high molecular compound having four or more functional groups each capable of forming a covalent bond with a carboxyl group. Additionally, the aqueous monomer solution may include other monomer described in (1-1).

Further, as other internal crosslinking agent, the aqueous monomer solution may include the internal crosslinking agent having two or more polymerizable ethylenical double bonds and/or other internal crosslinking agent having two or more functional groups.

(2-3) Drying Step

A polymer obtained in the aforementioned polymerization step is obtained as a hydropolymer. The obtained hydropolymer is, if necessary, pulverized in the form of a hydropolymer with water content of not less than 10 mass % but less than 70 mass %, for example. Further, the pulverized hydropolymer particles are dried. The drying is carried out normally in the temperature range of 150 to 250° C., preferably 150 to 220° C., more preferably 180 to 200° C. Drying at temperatures lower than 150° C. makes less prone to bringing an internal crosslinking reaction. Drying at temperatures higher than 250° C. might cause the resultant water-absorbent resin to be colored. Note that, in case where oil or steam is used as a heat medium, the drying temperature is a temperature of the heat medium. On the other hand, in case where electron beam irradiation or other means is used for drying without using the heat medium, the drying temperature is a temperature of the material (object to be dried). Alternatively, the drying temperature may be changed stepwise. The duration of the drying may be determined to obtain a target water content, depending upon surface area and water content of the hydropolymer and the type of a drying oven. For example, the duration of the drying is in the range of 10 to 180 minutes, more preferably 30 to 120 minutes. Note that, in the present invention, the crosslinked polymer having been dried is referred to as a water-absorbent resin.

The water content of the water-absorbent resin usable in the present invention is not particularly limited, but the water-absorbent resin is particles (powder) showing fluidity also at room temperature, and the water-absorbent resin is in a powder form whose water content is more preferably 0.2 to 30 mass %, still more preferably 0.3 to 15 mass %, particularly preferably 0.5 to 10 mass %. In case where the water content is higher than an upper limit of the foregoing range, the fluidity of the water-absorbent resin drops which may cause a trouble in the production, may make it impossible to pulverize the water-absorbent resin, and may make it impossible to control for specific particle diameter distribution.

As a drying method as used, various kinds of methods can be adopted so as to obtain a target water content, such as heat drying, hot-air drying, reduced-pressure drying, infrared drying, microwave drying, dehydration by azeotropy with a hydrophobic organic solvent, high-temperature drying by means of high-temperature steam. The drying method is not particularly limited.

A shape of the water-absorbent resin obtained by the above method is not particularly limited as long as the water-absorbent resin can be treated as powder. For example, the shape is generally such as spherical shape, fibrous shape, bar shape, approximately spherical shape, flat shape, irregular shape, granulated particle shape, particles having a perforated structure, and similar shape. However, it is preferable to use a water-absorbent resin having an irregularly pulverized shape obtained by carrying out the pulverization step.

(2-4) Pulverization Step

The method according to the present invention for producing a water-absorbing agent preferably includes the pulverization step in which the obtained hydropolymer or water-absorbent resin is pulverized before or after the drying step, preferably before and after the drying step.

In case of pulverizing the resultant hydropolymer obtained before the drying step, the resultant hydropolymer is extruded from the perforated structure whose perforation diameter is preferably 0.3 to 22 mm, more preferably 1 to 20 mm, still more preferably 5 to 18 mm so as to be pulverized, thereby obtaining pulverized hydropolymer particles. By such extrusion of the hydropolymer from the perforated structure having the specific perforation diameters to thus pulverize the hydropolymer, it becomes possible to form it into the pulverized hydropolymer particles which can sufficiently exert the effects of the present invention. The shape of the perforations is such as a circular, quadrangular (e.g. square, rectangular), triangular, or hexagonal shape and is not particularly limited. However, preferably, the hydropolymer is extruded from circular perforations. Note that, the aforementioned perforation diameters are defined as the diameters given in the case of converting the outer peripheries of the mesh opening portions into those of the circles.

Examples of the apparatus for carrying out the extrusion pulverization in order to obtain the pulverized hydropolymer particles include such as extrudes the hydropolymer from a perforated plate to thereby pulverize the hydropolymer. As the extrusion mechanism, there is used the mechanism of the type which can press-feed the hydropolymer from its supply inlet to the perforated plate, such as screw type or rotary roll type. The screw type extruder may be a single or multiple screw type and may be a type which is used usually for extrusion molding of edible meat, rubber, and plastic or used as a pulverizer. Examples thereof include meat choppers and Dome Gran.

It is preferable that the water-absorbent resin usable in the present invention is particulate water-absorbent resin particles, and it is preferable that at least part of the particles is granulated particles. More preferably, these granulated particles are those which are obtained through granulation of particles having particle diameters of smaller than 150 μm. The process for achieving such a mode that at least part of the water-absorbent resin particles are granulated particles is not particularly limited and will do if hitherto publicly known granulation processes are applied thereto. Examples of such applicable processes include processes in which: warm water and a fine powder of water-absorbent resin particles are mixed together and then dried (U.S. Pat. No. 6,228,930); a fine powder of water-absorbent resin particles is mixed with an aqueous monomer solution, and then the resultant mixture is polymerized (U.S. Pat. No. 5,264,495); water is added to a fine powder of water-absorbent resin particles, and then the resultant mixture is granulated under not less than a specific face pressure (EP 0844270); a fine powder of water-absorbent resin particles is sufficiently wetted to thus form an amorphous gel, and then this gel is dried and pulverized (U.S. Pat. No. 4,950,692); and a fine powder of water-absorbent resin particles and a polymer gel are mixed together (U.S. Pat. No. 5,478,879).

In addition, it is preferable that at least part of the water-absorbent resin particles usable in the present invention are foamed particles. These foamed particles are preferably those which are obtained by a process characterized by including the step of polymerizing the monomer containing an azo initiator or a foaming agent (e.g. a carbonate) or polymerizing the monomer while it contains bubbles by causing it to bubble with an inert gas.

It is preferable that the water-absorbent resin or the aqueous-liquid-absorbent resin of the present invention has a bulk density within the range described in (1-3) and includes granulated particles so as not deviate from the range. In case where the bulk density deviates from the foregoing range or no granulated particles are included, it may be impossible to exhibit the effects of the present invention. By obtaining the aqueous-liquid-absorbing agent including such granulated particles, it is possible to more easily obtain the aqueous-liquid-absorbing agent excellent in the absorption rate, the absorbency, and the saline flow conductivity.

Conditions for pulverizing the hydropolymer or the pulverized hydropolymer particles (preferably, after having dried it) are not especially limited. However, for example, hitherto known pulverizers (e.g. roll mills, hammer mills) are usable. The shape obtained by the pulverization is preferably an irregularly pulverized shape and, more preferably, particles of a granulated shape having a large surface area are partly contained.

The water-absorbent resin particles usable in the present invention are, for example, further processed by such as classification, whereby the weight-average particle diameter and the logarithmic standard deviation ($\sigma\zeta$) are adjusted in the range described in (1-3). As to the water-absorbent resin particles usable in the present invention, it is possible to further exhibit the effects of the present invention by adjusting the weight-average particle diameter and the logarithmic standard deviation ($\sigma\zeta$) in this manner.

In the present invention, in case of performing the classification as required, it is necessary to chose a sieve used in the classification in consideration for a classification efficiency. For example, in case where the water-absorbent resin particles or the aqueous-liquid-absorbing agent passing through a sieve whose mesh size is 150 μm are removed by the classification, it is difficult to completely remove particles whose particle diameter is not more than 150 μm. Thus, in order to obtain the water-absorbent resin particles or the water-absorbing agent having a desired particle diameter, it is preferable to suitably chose a type of the sieve to be used.

For still more exerting the effects of the present invention, the water-absorbent resin particles usable in the present invention include particles having particle diameters in the range of 150 to 850 μm preferably in an amount of 90 to 100 weight %, more preferably in an amount of 95 to 100 weight %. In case where particles of smaller than 150 μm in particle diameter are included in a large amount, there is a possibility that the liquid permeability may be so poor as to result in failure to sufficiently exert the effects of the present invention. In case where particles of larger than 850 μm in particle diameter are included in a large amount, there is a possibility that, on the occasion of the practical use, for example, an unpleasant feeling may be given to human bodies during the contact therewith.

(2-5) Surface Crosslinking Step

In the process for producing an aqueous-liquid-absorbing agent according to the present invention, the water-absorbent resin particles are subjected to surface crosslinking for still more exerting the effects of the present invention. The surface crosslinking step is carried out in at least one stage selected from among before, simultaneously with, and after the step of subjecting the water-absorbent resin particles to the later-described liquid permeability enhancing treatment step.

As the surface crosslinking agent usable in the present invention, it is possible to use the surface crosslinking agent described in (1-1).

Although depending upon compounds as used, their combination, and others, the amount of the surface crosslinking agent, as used, is preferably in the range of not less than 0.001 and not more than 10 weight %, more preferably in the range of not less than 0.01 and not more than 5 weight %, with respect to the water-absorbent resin.

In the present invention, it is preferable to use water in performing the surface crosslinking. At this time, although depending on the water content of the water-absorbent resin used, it is general that an amount of water is preferably not less than 0.5 weight % and not more than 10 weight %, more preferably not less than 0.5 weight % and not more than 10 weight %, with respect to the water-absorbent resin. Further, in the present invention, a hydrophilic organic solvent other than water may be used, and its amount is preferably not less than 0 and not more than 10 weight %, more preferably not less than 0 and not more than 5 weight %, still more preferably not less than 0 and not more than 3 weight %, with respect to the water-absorbent resin.

Further, in addition to the surface crosslinking agent, it is possible to use acidic substances such as organic acid (lactic acid, citric acid, p-toluene-sulfonic acid) and inorganic acid (phosphoric acid, sulfuric acid, sulfurous acid), basic substance such as caustic soda and sodium carbonate, polyvalent metal such as aluminum sulfate, in an amount of 0 to 10 weight %, more preferably 0 to 5 weight %, particularly preferably 0 to 1 weight %, with respect to the water-absorbent resin.

In case of performing the surface crosslinking in the present invention, after mixing water and/or the hydrophilic organic solvent with the surface crosslinking agent in advance, the aqueous liquid is preferably sprayed or dropped/mixed to the water-absorbent resin, and the aqueous liquid is more preferably sprayed to the water-absorbent resin. As to a size of the sprayed drop, its average particle diameter preferably ranges from 0.1 to 300 µm, more preferably from 0.1 to 200 µm.

In order to uniformly and surely mix the water-absorbent resin of the present invention with (i) the surface crosslinking agent and (ii) water, and/or the hydrophilic organic solvent, an apparatus used to mix these components preferably has a great mixing ability. Preferable examples of the apparatus include: a cylindrical mixer, a double-wall circular cone mixer, a high-speed-stirring mixer, a V-shaped mixer, a ribbon blender, a screw mixer, a double-arm kneader, a pulverizing kneader, a rotary disc mixer, an air current mixer, a turbulizer, a batch-type Lödige mixer, and a sequential Lödige mixer.

It is preferable that the water-absorbent resin with which the surface crosslinking agent has been mixed is subjected to a heat-treatment. A temperature at which the heat-treatment is performed (heat medium temperature or material temperature) preferably ranges from 120 to 250° C., more preferably from 150 to 250° C. The duration of the heat-treatment preferably ranges from 1 minute to two hours. Preferable examples of a combination of the heating temperature and the heating duration are 0.1 to 1.5 hours at 180° C. and 0.1 to 1 hour at 200° C.

An apparatus for performing the heat-treatment is not particularly limited as long as the apparatus allows heat to be uniformly conducted to the mixture of the surface crosslinking agent and the water-absorbent resin. In order to carry out the uniform heat-treatment without fail, it is preferable to include a large mixing apparatus. Examples of the apparatus for performing the heat-treatment include a dryer or an oven of a belt type, a trench stirring type, a screw type, a rotation type, a disk type, a kneading type, a fluidized-bed type, an air flow type, an infrared type, or an electron beam type.

(2-6) Liquid Permeability Enhancing Treatment Step

The process for producing an aqueous-liquid-absorbing agent according to the present invention preferably includes the liquid permeability enhancing treatment step for subjecting the water-absorbent resin particles to treatment for liquid permeability enhancement. The liquid permeability enhancing treatment step may be carried out at any time of before, simultaneously with, or after the surface crosslinking step. However, for more exerting the effects of the present invention, it is preferable that the liquid permeability enhancing treatment step is carried out after the surface crosslinking step and separately therefrom.

The liquid-permeability-enhancement agent is more preferably a water-soluble multivalent metal compound or water-soluble polycationic compound, still more preferably a water-soluble multivalent metal compound, especially preferably at least one compound selected from among the groups consisting of compounds having aluminum compounds, zirconium compounds, titanium compounds, and compounds having an amino group. Specifically, examples of the liquid-permeability-enhancement agent includes the ones exemplified in (1-2). In addition, the liquid-permeability-enhancement agent is preferably water-soluble because it can be easily added more uniformly over the entire surface of the water-absorbent resin without demixing and other demerits.

The liquid-permeability-enhancement agent is used in an amount of preferably 0.001 to 10 weight %, more preferably 0.01 to 5 weight %, relative to the water-absorbent resin particles.

The method for adding the liquid-permeability-enhancement agent is not especially limited. It may be dry-blend, or the liquid-permeability-enhancement agent may be added in the form of an aqueous solution or a dispersion liquid, or the addition method may be carried out by heat-fusion.

More specifically, the dry-blend is a method in which the water-absorbent resin particles are uniformly mixed with the above liquid-permeability-enhancement agent (which is solid and powdery) (e.g. the multivalent metal compound or inorganic fine particles) after having been dried and pulverized. If necessary, after this mixing, water or an aqueous polyhydric alcohol solution may further be added and mixed, and further, heating may be carried out. The "addition in the form of an aqueous solution" is a method in which an aqueous solution of such as the multivalent metal compound or polycationic compound is added to the water-absorbent resin particles to mix them together. The higher the concentration of the multivalent metal compound or polycationic compound is, the more preferable it is. In addition, after the mixing, heating may be carried out, if necessary. The heat-fusion is a method in which: the heating is carried out at the same time as or after mixing the multivalent metal hydrate (e.g. aluminum sulfate, potassium alum, ammonium alum, sodium alum) and the water-absorbent resin particles together; or the water-absorbent resin particles having been preheated are mixed with the multivalent metal compound; whereby the multivalent metal hydrate is fused and then made to adhere to the water-absorbent resin particles. If necessary, water may be added before the heating.

EXAMPLES

Hereinafter, the present invention is more specifically illustrated by the following Examples and Comparative Examples. However, the present invention is not limited to them. Hereinafter, for convenience, the units "weight part(s)" and "liter(s)" may be referred to simply as "part(s)" and "L" respectively. In addition, the unit "weight %" may be referred to as "wt %".

The measurement and evaluation methods in the Examples and the Comparative Examples are shown below. Unless otherwise noted, the following measurement and evaluation are stated as having been carried out under conditions of a room temperature (25° C.) and a humidity of 50 RH %.

Note that, the following statement is made on the assumption that the water-absorbent resin or water-absorbing agent is measured and evaluated. Thus, in case of measuring the water-absorbing agent, the measurement is carried out by replacing the "water-absorbent resin" described in the measurement method with the "water-absorbing agent". In addition, in case where a commercially available water-absorbent resin or a water-absorbent resin separated from a diaper is measured, it is measured after having appropriately been dried under a reduced pressure (e.g. at 60 to 80° C. for 16 hours) so as to have a solid content of 90 to 100 weight %.

(a) Absorbency (CRC: Centrifuge Retention Capacity)

An amount of 0.200 g of water-absorbent resin was uniformly placed into a bag (80 mm×60 mm) made of nonwoven fabric (trade name: Heatron Paper, type: GSP-22, produced by Nangoku Pulp Kogyo Co., Ltd.) and then immersed into a physiological saline (hereinafter the physiological saline all refers to a 0.9 weight % aqueous sodium chloride solution) of which the temperature had been adjusted to 25° C. After 30 minutes, the bag was pulled up and then drained of water by a centrifugal force of 250 G with a centrifugal separator (produced by Kokusan Co., Ltd., centrifugal separator: model H-122) for 3 minutes, and then the weight $W_1$ (g) of the bag was measured. In addition, the same procedure as the above was carried out without the water-absorbent resin, and the resultant weight $W_0$ (g) was measured. Then, the CRC (g/g) was calculated from these $W_1$ and $W_0$ in accordance with the following equation:

$$CRC(g/g)=[(W_1(g)-W_0(g))/\text{weight (g) of water-absorbent resin}]-1$$

(b) Absorbency Against Pressure (AAP)

The absorbency against pressure (AAP) refers to an absorbency against pressure for a physiological saline (0.9 weight % aqueous sodium chloride solution) under a load of 4.83 kPa in 60 minutes.

The measurement was carried out with an apparatus as shown in FIG. 1.

A stainless metal gauze 101, which was a screen of 400 meshes (mesh opening size: 38 μm), was fused to a bottom of a plastic supporting cylinder 100 having an inner diameter of 60 mm. Then, under conditions of a room temperature (23.0±2.0° C.) and a humidity of 50 RH %, onto the above metal gauze, there was uniformly spread 0.90 g of water-absorbent resin 102, and further thereon, there were mounted a piston 103 and a load 104 in sequence, wherein the piston had an outer diameter of only a little smaller than 60 mm and made no gap with the inner wall surface of the supporting cylinder, but was not hindered from moving up and down, and wherein the piston and the load were adjusted so that a load of 4.83 kPa (0.7 psi) could uniformly be applied to the water-absorbent resin. Then, the weight Wa (g) of the resultant one set of measurement apparatus was measured.

A glass filter plate 106 having a diameter of 90 mm (produced by Sogo Rikagaku Glass Seisakusho Co., Ltd., pore diameter: 100 to 120 μm) was mounted inside a Petri dish 105 having a diameter of 150 mm, and then a physiological saline (0.9 weight % aqueous sodium chloride solution) 108 (20 to 25° C.) was added up to the same level as the upside of the glass filter plate, on which a filter paper 107 having a diameter of 90 mm (produced by ADVANTEC Toyo Co., Ltd., trade name: (JIS P 3801, No. 2), thickness: 0.26 mm, diameter of captured particles: 5 μm) was then mounted so that its entire surface would be wetted, and further, an excess of liquid was removed.

The one set of measurement apparatus was mounted on the above wet filter paper, thereby getting the liquid absorbed under the load for a predetermined duration. This absorption duration was defined as 1 hour from the start of the measurement. Specifically, 1 hour later, the one set of measurement apparatus was removed by being lifted to measure its weight Wb (g). This measurement of the weight must be carried out as quickly as possible and so as not to give any vibration. Then, the absorbency against pressure (AAP) (g/g) was calculated from the Wa and Wb in accordance with the following equation:

$$AAP(g/g)=[Wb(g)-Wa(g)]/\text{weight (g) of aqueous-liquid-absorbing agent}$$

(c) Absorption Rate (FSR: Free Swell Rate)

1.000±0.0005 g of water-absorbent resin was weighed out precisely to the fourth decimal place (unit: g) ($W_A$). This water-absorbent resin as weighed out was placed into a 25 ml glass beaker (diameter: 32-34 mm, height: 50 mm), when the upside of the water-absorbent resin as placed into the beaker was made horizontal. If necessary, a treatment such as of cautiously tapping the beaker may be carried out to make the surface of the water-absorbent resin horizontal. Next, 20 ml of physiological saline (0.9 weight % aqueous sodium chloride solution), of which the temperature had been adjusted to 23.0±2.0° C., was weighed out into a 50 ml glass beaker, and then the weight (unit: g) was measured to the fourth decimal place ($W_1$). Then, the physiological saline as weighed out was carefully and quickly poured into the 25 ml beaker containing the water-absorbent resin. The time measurement was started at the same time as when the poured physiological saline contacted with the water-absorbent resin. Then, the upside of the physiological saline in the beaker into which the physiological saline had been poured was observed at an angle of about 20° with the eye. Then, the time measurement was ended when the upside, which had been the liquid surface of the physiological saline at the start, had been replaced by the surface of the water-absorbent resin (having absorbed the physiological saline) as a result of the absorption of the physiological saline into the water-absorbent resin (unit: sec) ($t_s$). Next, the weight (unit: g) of the physiological saline, which remained attaching to the 50 ml beaker after the pouring of the physiological saline, was measured to the fourth decimal place ($W_2$). The Weight ($W_F$, unit: g) of the poured physiological saline was determined from the equation (a) below.

The water absorption rate (FSR) was calculated from the equation (c) below.

$$W_F(g)=W_1(g)-W_2(g) \quad\quad \text{Equation (a):}$$

$$FSR(g/g/s)=W_F/(t_s \times W_A) \quad\quad \text{Equation (c):}$$

The same measurement was carried out repeatedly three times per one sample. The measurement result was defined as the average value of the three-time-measured values.

(d) Saline Flow Conductivity (SFC)

Calculation of the saline flow conductivity was performed in accordance with a saline flow conductivity (SFC) test recited in Published Japanese Translations of International Publication of Patent Application No. 509591/1997 (Tokuhyohei 9-509591).

Figure 2:
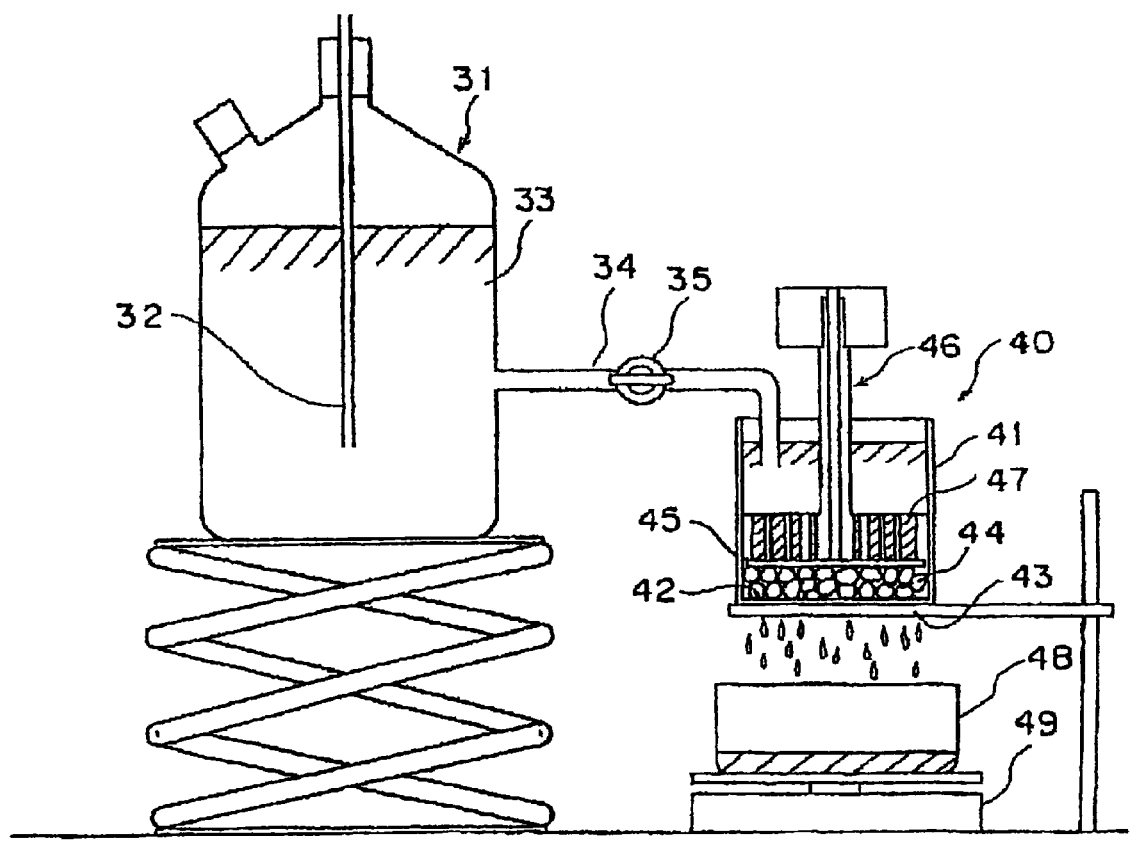
FIG. 2 is a cross sectional view schematically illustrating a measuring apparatus used to measure SFC.

By using an apparatus shown in FIG. 2, the water absorbent resin (0.900 g) evenly spread in a container 40 was swollen in a synthesized urine (1) under a pressure of 0.3 psi (2.07 kPa) for 60 minutes and a height of a gel layer of a gel 44 was recorded. Then, under a pressure of 0.3 psi (2.07 kPa), 0.69 mass % sodium chloride solution 33 was made to flow from a tank 31 and to pass through the swollen gel layer at a constant hydrostatic pressure.

By using a computer and a scale, an amount of liquid passing through the gel layer at intervals of 20 seconds was recorded for 10 minutes as a time function. A flow rate $F_s(t)$ of the solution passing through the swollen gel 44 (mainly between particles thereof) was determined in terms of g/s by dividing an increasing weight (g) by an increasing time (s). A time in which a constant hydrostatic pressure and a stable flow rate had been obtained was set as "$t_s$", and only data obtained between "$t_s$" and a ten-minute interval was used to calculate the flow rate, the flow rate calculated between "$t_s$" and a ten-minute interval was used to calculate a value of $F_s$ (t=0), i.e., a first flow rate of the solution passing through the gel layer. $F_s$ (t=0) was calculated by extrapolating into t=0 a result obtained by carrying out least square of $F_s$ (t) and a duration.

Saline Flow Conductivity (SFC)

$$=(F_s(t=0) \times L_0)/(\rho \times A \times \Delta P)$$

$$=(F_s(t=0) \times L_0)/139506$$

Here, $F_s$ (t=0): a flow rate represented by "g/s"

$L_0$: a height of the gel layer that is represented by "cm"

$\rho$: a density (1.003 g/cm$^3$) of NaCl solution

A: an area (28.27 cm$^2$) on the upper side of the gel layer of the cell 41

$\Delta P$: a hydrostatic pressure (4920 dyne/cm$^2$) exerted to the gel layer. Further, a unit of the saline flow conductivity (SFC) is (cm$^3 \cdot$s$\cdot$b $10^{-7}$/g).

In the apparatus shown in FIG. 2, a glass tube 32 was inserted into the tank 31, and a lower end of the glass tube 32 was disposed so that 0.69 weight % sodium chloride solution 33 was positioned 5 cm higher than a bottom of the swelling gel 44 in the cell 41. 0.69 mass % sodium chloride solution 33 contained in the tank 31 was supplied to the cell 41 via an L-shaped tube 34 with a cock. A collecting container 48 for collecting liquid having passed through the gel layer was disposed under the cell 41, and the collecting container 48 was placed on an even balance 49. An inside diameter of the cell 41 was 6 cm, and No. 400 stainless metal gauze (38 μm in mesh) 42 was placed on a bottom of a lower portion of the cell 41. A hole 47 which allowed liquid to pass through was provided on a lower portion of a piston 46, and a glass filter 45 having high permeability was provided on the bottom thereof so that the water-absorbent resin composition or the swelling gel did not enter into the hole 47. The cell 41 was placed on a table for the cell, and the table's surface which is in contact with the cell was positioned on the stainless metal gauze 43 which did not prevent the liquid from passing through.

The synthesized urine (1) was prepared by mixing 0.25 g of calcium chloride dihydrate, 2.0 g of potassium chloride, 0.50 g of magnesium chloride hexahydrate, 2.0 g of sodium sulfate, 0.85 g of ammonium dihydrogen phosphate, 0.15 g of ammonium dihydrogen phosphate, and 994.25 g of pure water.

(e) Particle Diameter

The water absorbent resin having been pulverized was sieved by using JIS standard sieves respectively having mesh sizes of 850 μm, 710 μm, 600 μm, 500 μm, 425 μm, 300 μm, 212 μm, 150 μm, 45 μm, and the like, and a residual percentage R was plotted on a logarithmic probability paper. Then, a particle diameter was read as the mass average particle diameter (D50). Note that, in case where a water-absorbent resin whose particle diameter exceeds 850 μm, a commercially available JIS standard sieve whose opening mesh size exceeds 850 μm.

(f) Logarithmic Standard Deviation ($\sigma\zeta$) of Particle Diameter Distribution The water absorbent resin was sieved by using JIS standard sieves respectively having mesh sizes of 850 μm, 710 μm, 600 μm, 500 μm, 425 μm, 300 μm, 212 μm, 150 μm, 45 μm, and the like, and a residual percentage R was plotted on a logarithmic probability paper. Note that, in case where a water-absorbent resin whose particle diameter exceeds 850 μm, a commercially available JIS standard sieve whose opening mesh size exceeds 850 μm. Further, assuming that X1 is a particle diameter in case where R=84.1 weight % and X2 is a particle diameter in case where R=15.9 weight %, the logarithmic standard deviation ($\sigma\zeta$) is represented by the following equation. As a value of $\sigma\zeta$ is smaller, the particle diameter distribution is narrower.

$$\sigma\zeta = 0.5 \times \ln(X2/X1)$$

Classification in measuring (e) the particle diameter, and (f) the logarithmic standard deviation ($\sigma\zeta$) of the particle diameter distribution was performed as follows: 10.0 g of the water absorbent resin particles or the water absorbent resin composition was spread on JIS standard sieves (THE IIDA TESTING SIEVE: diameter is 8 cm) respectively having mesh sizes of 850 μm, 710 μm, 600 μm, 500 μm, 425 μm, 300 μm, 212 μm, 150 μm, and 45 μm, and was classified by using a sieve shaker (IIDA SIEVE SHAKER, TYPE: ES-65, SER. No. 0501) for five minutes.

(g) Bulk Density

The bulk density of the water-absorbent resin particles was measured in accordance with a method described in edana 460.1-99.

(h) Extractable Component Content 184.3 g of a pysiological saline (0.90 weight % of aqueous sodium chloride solution) was measured and pored into a 250 ml plastic container having a cover. Into the aqueous solution, 1.00 g of a water absorbent resin was added, and the solution was stirred for 16 hours. In this way, an extractable component of the water absorbent resin was extracted. The extract solution was filtered through a piece of filter paper (product of ADVANTEC Toyo Kaisha, Ltd.; product name: JIS P3801, No. 2; thickness: 0.26 mm; diameter of retained particles: 5 m), thereby obtaining a filtrate. 50.0 g of the filtrate was measured, and used as a measurement solution.

First, only the physiological saline was titrated by using a 0.1N NaOH aqueous solution, until pH of the physiological saline reached 10. After that, the physiological saline was titrated by using a 0.1N HCl aqueous solution, until pH of the physiological saline reached 2.7. In this way, empty titration amounts ([bNaOH]ml and [bHCl]ml) were measured.

The same operation was performed with respect to the measurement solution, thereby measuring titration amounts ([NaOH]ml and [HCl]ml).

For example, in case of a water-absorbent resin including a known amount of acrylic acid and its sodium salt, an extractable component content in the water-absorbent resin was calculated, in accordance with the following equation, from an average molecular mass of the monomer and the titration amounts obtained by the foregoing operation. In case of an unknown amount, the average molecular mass of the monomer was calculated by using a neutralization ratio calculated by the titration.

Extractable component (wt %)=0.1×(average molecular mass)×184.3×100×([HCl]−[bHCl])/1000/1.0/50.0

Neutralization ratio (mol %)=(1−([NaOH]−[bNaOH])/([HCl]−[bHCl]))×100

(i) Solid Content or Water Content 1.000 g of a water-absorbent resin was weighed out to the third decimal place, and was placed in an aluminum cup (diameter: 52 mm), and was heated for three hours in a windless oven at 180° C. Then, a solid content or a water content was calculated from a drying loss of the water absorbent resin.

The solid content or the water content is a value obtained in accordance with the following equation.

Solid content (wt %)=(weight of dried sample/weight of sample having not been dried)×100

Water content (wt %)={(weight of sample having not been dried−weight of dried sample)/weight of sample having not been dried}×100

(j) Surface Tension 50 ml of physiological saline whose temperature had been adjusted to 20° C. was poured into a 100 ml beaker that had been sufficiently rinsed. First, a surface tension of the physiological saline was measured by using a tensiometer (K11 automatic tensiometer, product of KRUSS). In this measurement, the surface tension needs to be within a range of 71 to 75 mN/m. Next, a sufficiently rinsed fluorine rotor whose length was 25 mm and 0.5 g of the water-absorbing agent were put into the beaker containing the physiological saline whose temperature had been adjusted to 20° C., and were stirred for 4 minutes under a condition of 500 rpm. 4 minutes later, the stirring operation was stopped, and the water-absorbing agent containing water was precipitated. Thereafter, a surface tension of a supernatant liquid was measured by performing the same operation again. Note that, the present invention adopted a plate method using a platinum plate, and the plate was sufficiently rinsed before performing the measurement, and was thermally rinsed with a burner.

(k) Amount of Unreacted Non High Molecular Compound Relative to the Water-Absorbing Agent 1 g of water-absorbing agent was put into 100 g of a physiological saline (0.9 mass % aqueous sodium chloride solution), and the mixture was stirred with a magnet stirrer by using a stirrer chip whose length was 30 mm for 4 hours under a condition of 300 r.p.m. The stirred physiological saline was filtered. An extract obtained as a filtrate was analyzed by Liquid Chromatography and was quantified by an analytical curve which had been prepared in advance. Note that, the analytical curve was prepared by analyzing solutions prepared so as to have known amounts of about 10, 50, 100, 200, 500, 1000, 2000, and 5000 ppm. As an analysis column, Shodex SUGAR SH1011 (product of Showa Denko K.K.) was used.

Example 1

Operation 1-1

In a polypropylene-made container of 80 mm in inner diameter and 1 liter in capacity as covered with polystyrene foam being a heat insulator, a solution (A) was prepared by mixing 293 g (4.1 mol) of acrylic acid, 0.215 g (0.01 mol % with respect to an unsaturated monomer having a carboxyl group) of polyethyleneglycoldiacrylate (the number of recurring units of ethyleneglycol was 9) serving as other internal crosslinking agent, 1.80 g of a 1.0 weight % aqueous pentasodium diethylenetriaminepentaacetate solution, 3.60 g of 1.0 weight % acrylic acid solution of IRGACURE (Registered Trademark) 184 together, and a solution (B) was prepared by mixing (i) a mixture solution of 238 g of 48.5 weight % of aqueous sodium hydroxide solution and 252 g of ion-exchanged water of which the temperature had been adjusted to 50° C. with (ii) 0.20 g (0.04 mol % with respect to the unsaturated monomer having a carboxyl group) of meso-erythritol together. The solution (B) was quickly added to the solution (A) being stirred with a magnetic stirrer whose length was 5 cm under a condition of 800 r.p.m. to mix them together, thus obtaining an aqueous monomer solution (C). As to the aqueous monomer solution (C), its liquid temperature rose to about 100° C. due to the neutralization heat and the dissolution heat. Note that, a neutralization ratio of acrylic acid was 70 mol %.

Next, 11 g of 3 weight % aqueous sodium persulfate solution was added to this aqueous monomer solution (C). Immediately after stirring carried out for about 1 second, the resultant mixture was poured into a stainless vat type container having an inner surface as coated with Teflon (registered trademark) in an open system. Simultaneously with pouring the aqueous monomer solution into the stainless vat type container, the stainless vat type container was irradiated with ultraviolet rays by means of an ultraviolet radiation device.

Shortly after the above pouring of the aqueous monomer solution (C) into the vat, polymerization started. A temperature of the polymerization reached its peak within about 1 minute. After 3 minutes, the ultraviolet irradiation was stopped, and then the resultant hydropolymer was got out. Note that, a series of these operations were carried out in an open system of the atmosphere.

Operation 1-2

The resultant hydropolymer was pulverized with a meat chopper (MEAT-CHOPPER, Type: 12VR-400KSOX, produced by Iizuka Kogyo Co., Ltd., die perforation diameter=6.4 mm, the number of perforations=38, die thickness=8 mm), thus obtaining hydropolymer particles having been divided into small pieces.

Operation 1-3

The resultant pulverized hydropolymer particles having been divided into small pieces were spread onto a metal gauze of 50 meshes (opening size: 300 μm) and then dried with hot air of 180° C. Next, the dried product was pulverized with a roll mill and then classified with JIS standard sieves having a mesh opening size of 850 μm and 45 μm, thus obtaining a water-absorbent resin (having a solid content of 96 weight %) of an irregularly pulverized shape.

Operation 1-4

An amount of 100 weight parts of the resultant water-absorbent resin was uniformly mixed with a surface crosslinking agent solution comprising a mixed liquid of 0.3 weight part of 1,4-butanediol, 0.6 weight part of propylene glycol, and 3.0 weight parts of pure water. Then, the water-absorbent resin, which had been mixed with the surface crosslinking agent solution, was heat-treated for surface crosslinking with a heating apparatus having a jacket (jacket temperature: 210° C.) for 35 minutes. After this heat treatment, the resultant water-absorbent resin was disintegrated to such a degree that they could pass through a JIS standard sieve having a mesh opening size of 850 μm. As a result, surface-crosslinked water-absorbent resin (1) was obtained. The water-absorbent resin (1) was used as a water-absorbing agent (1). Table 1 shows properties of the water-absorbing agent (1).

Note that, an amount of unreacted meso-erythritol in the water-absorbing agent analyzed by using Liquid Chromatography was 280 ppm with respect to the water-absorbing agent.

TABLE 1

| | | Internal crosslinking agent *1 | CRC *2 | SFC *3 | AAP *4 | FSR *5 |
|---|---|---|---|---|---|---|
| Ex. 1 | W-A agent 1 | meso-erythritol: 0.04 PEGDA: 0.01 | 28.8 | 38 | 23.2 | |
| Ex. 2 | W-A agent 2 | xylitol: 0.04 PEGDA: 0.01 | 29.4 | 33 | 23.4 | |
| Ex. 3 | W-A agent 3 | D-sorbitol: 0.04 PEGDA: 0.01 | 30.0 | 42 | 25.9 | 0.17 |
| Ex. 4 | W-A agent 4 | D-sorbitol: 0.04 PEGDA: 0.01 | 26.6 | 51 | 24.3 | 0.14 |
| Ex. 5 | W-A agent 5 | D-sorbitol: 0.04 PEGDA: 0.01 | 25.4 | 65 | 22.4 | |
| Ex. 6 | W-A agent 6 | D-sorbitol: 0.04 | 29.1 | 34 | 24.0 | |
| C-Ex. 1 | C-W-A agent 1 | PEGDA: 0.05 | 30.6 | 23 | 26.6 | |
| C-Ex. 2 | C-W-A agent 2 | ethyleneglycol: 0.04 PEGDA: 0.01 | 30.0 | 11 | 21.6 | |
| C-Ex. 3 | C-W-A agent 3 | ethyleneglycol: 0.04 PEGDA: 0.01 | 29.2 | 14 | 20.6 | 0.15 |
| C-Ex. 4 | C-W-A agent 4 | glycerin: 0.04 PEGDA: 0.01 | 30.3 | 5 | 21.2 | 0.13 |
| C-Ex. 5 | C-W-A agent 5 | glycerin: 0.04 PEGDA: 0.01 | 29.0 | 8 | 20.6 | 0.12 |

Ex.: Example
C-Ex.: Comparative Example
W-A agent: Water-absorbing agent
C-W-A agent: Comparative water-absorbing agent
PEGDA: polyethyleneglycoldiacrylate
*1: (Each value is indicative of mol % of internal crosslinking agent relative to acrylic acid)
*2: (g/g)
*3: ($cm^3 \cdot s \cdot 10^{-7}/g$)
*4: (g/g)
*5: (g/g/s)

Example 2

The same operations as in Example 1 were carried out except that 0.20 g (0.04 mol % with respect to the unsaturated monomer having a carboxyl group) of the internal crosslinking agent meso-erythritol was changed to 0.25 g (0.04 mol % with respect to the unsaturated monomer having a carboxyl group) of xylitol, thereby obtaining a surface-crosslinked water-absorbent resin (2). The water-absorbent resin (2) was used as a water-absorbing agent (2). Table 1 shows properties of the water-absorbing agent (2).

Note that, an amount of unreacted xylitol in the water-absorbing agent analyzed by using Liquid Chromatography was 460 ppm with respect to the water-absorbing agent.

Examples 3 to 5

The same operations as in Example 1 were carried out except that 0.20 g (0.04 mol % with respect to the unsaturated monomer having a carboxyl group) of the internal crosslinking agent meso-erythritol was changed to 0.30 g (0.04 mol % with respect to the unsaturated monomer having a carboxyl group) of D-sorbitol, thereby obtaining surface-crosslinked water-absorbent resins (3) to (5). The water-absorbent resins (3) to (5) were used as water-absorbing agents (3) to (5). Table 1 shows properties of the water-absorbing agents (3) to (5). Note that, Examples 3, 4, and 5 were slightly different from Example 1 in the heat-treatment duration. The heat-treatment durations of Examples 3, 4, and 5 were respectively 25 minutes, 30 minutes, and 40 minutes.

In Example 5, an amount of unreacted sorbitol in the water-absorbing agent analyzed by using Liquid Chromatography was 280 ppm with respect to the water-absorbing agent.

Example 6

The same operations as in Example 1 were carried out except that 0.20 g (0.04 mol % with respect to the unsaturated monomer having a carboxyl group) of the internal crosslinking agent meso-erythritol was changed to 0.30 g (0.04 mol % with respect to the unsaturated monomer having a carboxyl group) of D-sorbitol and polyethyleneglycoldiacrylate serving as other internal crosslinking agent was not used, thereby obtaining a surface-crosslinked water-absorbent resin (6). The water-absorbent resin (6) was used as a water-absorbing agent (6). Table 1 shows properties of the water-absorbing agent (6). Further, the heat-treatment duration of (Operation 1-4) was 30 minutes.

Note that, an amount of unreacted sorbitol in the water-absorbing agent analyzed by using Liquid Chromatography was 250 ppm with respect to the water-absorbing agent.

Comparative Example 1

The same operations as in Example 1 were carried out except that 1.10 g (0.05 mol % with respect to the unsaturated monomer having a carboxyl group) polyethyleneglycoldiacrylate was solely used as the internal crosslinking agent and meso-erythritol was not used, thereby obtaining a comparative water-absorbent resin (1). The comparative water-absorbent resin (1) was used as a comparative water-absorbing agent (1). Table 1 shows properties of the comparative water-absorbing agent (1).

Comparative Examples 2 and 3

The same operations as in Example 1 were carried out except that 0.20 g (0.04 mol % with respect to the unsaturated monomer having a carboxyl group) of the internal crosslinking agent meso-erythritol was changed to 0.10 g (0.04 mol % with respect to the unsaturated monomer having a carboxyl group) of ethyleneglycol (polyethyleneglycoldiacrylate serving as other internal crosslinking agent was used as in Example 1), thereby obtaining surface-crosslinked comparative water-absorbent resins (2) and (3). The comparative water-absorbent resins (2) and (3) were used as comparative water-absorbing agents (2) and (3). Table 1 shows properties of the comparative water-absorbing agents (2) and (3).

Comparative Examples 4 and 5

The same operations as in Example 1 were carried out except that 0.20 g (0.04 mol % with respect to the unsaturated monomer having a carboxyl group) of the internal crosslinking agent meso-erythritol was changed to 0.152 g (0.04 mol % with respect to the unsaturated monomer having a carboxyl group) of glycerin (polyethyleneglycoldiacrylate serving as other internal crosslinking agent was used as in Example 1), thereby obtaining surface-crosslinked comparative water-absorbent resins (4) and (5). The comparative water-absorbent resins (4) and (5) were used as comparative water-absorbing agents (4) and (5). Table 1 shows properties of the comparative water-absorbing agents (4) and (5).

In Comparative Example 4, an amount of unreacted glycerin in the water-absorbing agent analyzed by using Liquid Chromatography was 130 ppm with respect to the water-absorbing agent.

Example 7

With respect to the water-absorbent resin (1) obtained in Example 1, the following operation 1-5 was additionally performed, thereby obtaining a water-absorbing agent (7) to which a liquid-permeability-enhancement agent was added. Table 2 shows properties of the water-absorbing agent (7).

Operation 1-5

1 weight part of aluminum sulfate hydrate (tridecane or tetradecane hydrate: obtained from Sumitomo Chemical Co., Ltd.) was uniformly mixed with 100 weight parts of the surface-crosslinked water-absorbent resin (1), thereby obtaining a water-absorbing agent (7). Table 2 shows properties of the water-absorbing agent (7).

TABLE 2

| | | Internal crosslinking agent *1 | CRC *2 | SFC *3 | AAP *4 | FSR *5 |
|---|---|---|---|---|---|---|
| Ex. 7 | W-A agent 7 | meso-erythritol: 0.04 PEGDA: 0.01 | 28.6 | 67 | 21.8 | 0.19 |
| Ex. 8 | W-A agent 8 | xylitol: 0.04 PEGDA: 0.01 | 29.3 | 63 | 20.7 | 0.17 |
| E. 9 | W-A agent 9 | D-sorbitol: 0.04 PEGDA: 0.01 | 30.0 | 80 | 24.7 | |
| Ex. 10 | W-A agent 10 | D-sorbitol: 0.04 PEGDA: 0.01 | 28.5 | 90 | 21.4 | |
| Ex. 11 | W-A agent 11 | D-sorbitol: 0.04 PEGDA: 0.01 | 25.1 | 120 | 20.0 | |
| Ex. 12 | W-A agent 12 | D-sorbitol: 0.04 PEGDA: 0.01 | 29.3 | 73 | 21.5 | |
| C-Ex. 6 | C-W-A agent 6 | PEGDA: 0.05 | 31.1 | 36 | 23.7 | |
| C-Ex. 7 | C-W-A agent 7 | ethyleneglycol: 0.04 PEGDA: 0.01 | 30.0 | 16 | 20.6 | 0.13 |
| C-Ex. 8 | C-W-A agent 8 | ethyleneglycol: 0.04 PEGDA: 0.01 | 28.9 | 17 | | 0.12 |
| C-Ex. 9 | C-W-A agent 9 | glycerin: 0.04 PEGDA: 0.01 | 29.9 | 9 | 19.3 | 0.14 |
| C-Ex. 10 | C-W-A agent 10 | glycerin: 0.04 PEGDA: 0.01 | 29.5 | 13 | 19.5 | 0.11 |

Ex.: Example
C-Ex.: Comparative Example
W-A agent: Water-absorbing agent
C-W-A agent: Comparative water-absorbing agent
PEGDA: polyethyleneglycoldiacrylate
*1: (Each value is indicative of mol % of internal crosslinking agent relative to acrylic acid)
*2: (g/g)
*3: $(cm^3 \cdot s \cdot 10^{-7}/g)$
*4: (g/g)
*5: (g/g/s)

Examples 8 to 12

The same operations as in Example 7 were carried out except that the water-absorbent resin (1) was changed to the water-absorbent resins (2) to (6) obtained in Examples 2 to 6, thereby obtaining water-absorbing agents (8) to (12) to which liquid-permeability-enhancement agents were added. Table 2 shows properties of the water-absorbing agents (8) to (12).

Comparative Examples 6 to 10

The same operations as in Example 7 were carried out except that the water-absorbent resin (1) was changed to the comparative water-absorbent resins (1) to (5) obtained in Comparative Examples 1 to 5, thereby obtaining comparative water-absorbing agents (6) to (10) to which liquid-permeability-enhancement agents were added. Table 2 shows properties of the comparative water-absorbing agents (6) to (10).

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention relates to a water-absorbing agent whose liquid permeability has been enhanced and a production method thereof. If the water-absorbing agent is used for sanitary materials such as a disposable diaper, the water-absorbing agent exhibits higher liquid permeability than that of a conventional water absorbent structure and allows improvement in terms of problems such as low absorbency and leakage which are caused by gel blocking.

Further, the water-absorbing agent according to the present invention is widely applicable not only to the sanitary materials but also to conventional usages of the water-absorbent resin, e.g., agriculture/horticulture, cable water proofing agent, civil engineering and construction, and food products.

Therefore, the present invention is applicable not only to sanitary material production industry, horticulture industry, civil engineering and construction industry, food production industry, which respectively produce the foregoing materials, but also chemical industry in which a water-absorbing agent is produced. Thus, the present invention is very useful.

The invention claimed is:

1. A water-absorbing agent, comprising as a main component a water-absorbent resin having a crosslinked structure obtained by polymerizing an unsaturated monomer having a carboxyl group, wherein
an internal crosslinking agent comprising a non-high molecular weight compound having 4 to 10 functional groups, each capable of forming a covalent bond with a carboxyl group, wherein the functional groups are one or more functional groups selected from the group consisting of a hydroxyl group, amino group, oxetane group, oxazoline, cyclocarbonate, oxazolidinone, and cyclic urea, 0.5 to 4 times as many carbon atoms as the number of said functional groups, a molecular weight of not less than 90 but not more than 5000, and a functional group equivalent weight of not less than 20 g/mol but not more than 200 g/mol is introduced into an inside of the water-absorbent resin and where the inside of the water-absorbent resin is further crosslinked with an internal crosslinking agent other than the non-high molecular weight compound, which internal crosslinking agent has two or more polymerizable ethylenically unsaturated double bonds per molecule, wherein the water-absorbent resin is further subjected to surface crosslinking with an organic surface crosslinking agent and/or an inorganic surface crosslinking agent, and the water-absorbing agent including 100 ppm but not more than 10,000 ppm of the non-high molecular weight compound in which any of the functional groups capable of forming a covalent bond with a carboxyl group does not form a bond with the carboxyl group of the water-absorbent resin, and where an amount of usage of the non-high molecular weight compound is not less than 0.02 mol % but less than 24 mol % relative to the unsaturated monomer having the carboxyl group, and an amount of usage of the internal crosslinking agent having the two or more polymerizable ethylenically unsaturated double bonds per molecule is not less than 0.005 mol % but less than 0.1 mol % relative to the unsaturated monomer having the carboxyl group.

2. The water-absorbing agent as set forth in claim 1, wherein the water-absorbent resin is made of water-absorbent resin particles so that a ratio of particles whose particle diameter is not less than 150 μm and less than 850 μm is not less than 90 weight % with respect to a total amount of the water-absorbent resin particles.

3. The water-absorbing agent as set forth in claim 1, wherein each of the functional groups capable of forming a covalent bond with a carboxyl group is a hydroxyl group or an amino group.

4. The water-absorbing agent as set forth in claim 1, further comprising a liquid-permeability-enhancement agent.

5. The water-absorbing agent as set forth in claim 1, wherein when 0.5 g of the water-absorbing agent is dispersed in 50 ml of a physiological saline so as to obtain a water-absorbing agent dispersion liquid, a surface tension of the water-absorbing agent dispersion liquid is not less than 55 mN/m.

6. The water-absorbing agent as set forth in claim 1, wherein an absorbency (CRC) of the water-absorbing agent is greater than 25 g/g.

7. The water-absorbing agent as set forth in claim 1, wherein a saline flow conductivity (SFC) of the water-absorbing agent is not less than 30 $cm^3 \cdot s \cdot 10^{-7}/g$.

8. The water absorbing agent of claim 1, wherein said non-high molecular weight compound has 1 to 2 times as many carbon atoms as the number of said functional groups, a molecular weight of not less than 90 but not more than 500, and a functional group equivalent weight of not less than 30 g/mol but not more than 100 g/mol.

9. A water-absorbing agent, comprising as a main component a water-absorbent resin having a crosslinked structure obtained by polymerizing an unsaturated monomer having a carboxyl group, wherein
an internal crosslinking agent comprising a non-high molecular weight compound having 4 to 10 functional groups, each capable of forming a covalent bond with a carboxyl group, wherein the functional groups are one or more functional groups selected from the group consisting of a hydroxyl group, amino group, oxetane group, oxazoline, cyclocarbonate, oxazolidinone, and cyclic urea, 0.5 to 4 times as many carbon atoms as the number of said functional groups, a molecular weight of not less than 90 but not more than 5000, and a functional group equivalent weight of not less than 20 g/mol but not more than 200 g/mol is introduced into an inside of the water-absorbent resin, and the inside of the water-absorbent resin is crosslinked with at least a part of the non-high molecular weight compound introduced into the inside of the water-absorbent resin and where the inside of the water-absorbent resin is further crosslinked with an internal crosslinking agent other than the non-high molecular weight compound, which internal crosslinking agent has two or more polymerizable ethylenically unsaturated double bonds per molecule, wherein the water-absorbent resin is further subjected to surface crosslinking with an organic surface crosslinking agent and/or an inorganic surface crosslinking agent, and the water-absorbing agent including 100 ppm but not more than 10,000 ppm of the non-high molecular weight compound in which any of the functional groups capable of forming a covalent bond with a carboxyl group does not form a bond with the carboxyl group of the water-absorbent resin, and where an amount of usage of the non-high molecular weight compound is not less than 0.02 mol % but less than 24 mol % relative to the unsaturated monomer having the carboxyl group, and an amount of usage of the internal crosslinking agent having the two or more polymerizable ethylenically unsaturated double bonds per molecule is not less than 0.005 mol % but less than 0.1 mol % relative to the unsaturated monomer having the carboxyl group.

10. The water absorbing agent of claim 9, wherein said non-high molecular weight compound has 1 to 2 times as many carbon atoms as the number of said functional groups, a molecular weight of not less than 90 but not more than 500, and a functional group equivalent weight of not less than 30 g/mol but not more than 100 g/mol.

11. A method for producing a water-absorbing agent which includes as a main component a water-absorbent resin having a crosslinked structure obtained by polymerizing an unsaturated monomer having a carboxyl group,
said method comprising the steps of:
(i) polymerizing the unsaturated monomer having a carboxyl group and included in an aqueous monomer solution in the presence of an internal crosslinking agent comprising a non-high molecular weight compound having 4 to 10 functional groups, each capable of forming a covalent bond with a carboxyl group, wherein the functional groups are one or more functional groups selected from the group consisting of hydroxyl group, amino group, oxetane group, oxazoline, cyclocarbonate, oxazolidinone, and cyclic urea, 0.5 to 4 times as many carbon atoms as the number of said functional groups, a molecular weight of not less than 90 but not more than 5000, and a functional group equivalent weight of not less than 20 g/mol but not more than 200 g/mol, so as to obtain a hydropolymer, the aqueous monomer solution including an internal crosslinking agent other than the non-high molecular weight compound, which internal crosslinking agent has two or more polymerizable ethylenically unsaturated double bonds per molecule;

(ii) drying the hydropolymer, obtained in the step (i), so as to obtain the water-absorbent resin, and (iii) crosslinking a surface of the water-absorbent resin with an organic surface crosslinking agent and/or an inorganic surface crosslinking agent, wherein relative to the unsaturated monomer having a carboxyl group, an amount of usage (Y) (mol %) of the non-high molecular weight compound is in the range expressed by the following equation (1):

$$Y<0.06/\{2-(1.35X/100)\} \qquad (1)$$

where X represents a neutralization ratio (mol %) of the carboxyl group of the water-absorbent resin, X being not less than 45 and not more than 85, and where the amount of usage of the internal crosslinking agent having the two or more polymerizable ethylenically unsaturated double bonds per molecule is not less than 0.005 mol % but less than 0.1 mol % relative to the unsaturated monomer having the carboxyl group.

12. The method as set forth in claim 11, further comprising the step of (iv) adding a liquid-permeability-enhancement agent.

13. The method as set forth in claim 12, wherein the liquid-permeability-enhancement agent is a water-soluble polyvalent metal compound or a water-soluble polycationic compound.

14. The method as set forth in claim 12, wherein the liquid-permeability-enhancement agent is at least one compound selected from an aluminum compound, a zirconium compound, a titanium compound, and a compound having an amino group.

15. The method of claim 11, wherein said non-high molecular weight compound has 1 to 2 times as many carbon atoms as the number of said functional groups, a molecular weight of not less than 90 but not more than 500, and a functional group equivalent weight of not less than 30 g/mol but not more than 100 g/mol.

* * * * *